(12) United States Patent
Sahita et al.

(10) Patent No.: US 12,556,413 B2
(45) Date of Patent: Feb. 17, 2026

(54) TECHNIQUES TO IMPLEMENT CONFIDENTIAL COMPUTING WITH A REMOTE DEVICE VIA USE OF TRUST DOMAINS

(71) Applicant: Intel Corporation, Santa Clara, CA (US)

(72) Inventors: Ravi Sahita, Portland, OR (US); Jiewen Yao, Shanghai (CN); Utkarsh Y. Kakaiya, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 18/832,459

(22) PCT Filed: Mar. 30, 2022

(86) PCT No.: PCT/CN2022/083920
§ 371 (c)(1),
(2) Date: Jul. 23, 2024

(87) PCT Pub. No.: WO2023/184203
PCT Pub. Date: Oct. 5, 2023

(65) Prior Publication Data
US 2025/0168018 A1    May 22, 2025

(51) Int. Cl.
*H04L 9/32* (2006.01)

(52) U.S. Cl.
CPC .................... *H04L 9/3268* (2013.01)

(58) Field of Classification Search
CPC ......... H04L 9/3268; H04L 9/40; H04L 63/02; H04L 63/0428; H04L 63/0823; G06F 21/53; G06F 21/6145
See application file for complete search history.

(56) References Cited

U.S. PATENT DOCUMENTS

| | | | |
|---|---|---|---|
| 2015/0067086 A1* | 3/2015 | Adriaens | H04L 63/02 709/212 |
| 2018/0167268 A1* | 6/2018 | Liguori | H04L 67/10 |
| 2019/0228159 A1* | 7/2019 | Trikalinou | G06F 21/575 |
| 2020/0213115 A1 | 7/2020 | Mathane et al. | |
| 2020/0242258 A1* | 7/2020 | Smith | H04L 63/10 |
| 2021/0382996 A1 | 12/2021 | Jeansonne et al. | |
| 2022/0006637 A1 | 1/2022 | Nevis | |
| 2022/0012088 A1 | 1/2022 | Guim Bernat et al. | |
| 2023/0098288 A1 | 3/2023 | Shanbhogue et al. | |

(Continued)

FOREIGN PATENT DOCUMENTS

| | | |
|---|---|---|
| CN | 104335548 A | 2/2015 |
| CN | 104580314 A | 4/2015 |
| WO | 2023115248 A1 | 6/2023 |

OTHER PUBLICATIONS

International Search Report and Written Opinion for PCT Patent Application No. PCT/CN22/83920, Mailed Dec. 12, 2022, 9 pages.

*Primary Examiner* — Gil H. Lee
(74) *Attorney, Agent, or Firm* — Nicholson De Vos Webster & Elliott LLP

(57) ABSTRACT

Examples include techniques to implement confidential computing with a remote device via use of trust domains. Examples are described of establishing secure communication sessions between a trust domain supported by a hardware processor core on a first host platform and an input/output (I/O) device resident on a second host platform.

20 Claims, 23 Drawing Sheets

(56) References Cited

U.S. PATENT DOCUMENTS

2023/0205562 A1    6/2023    Basak et al.
2023/0273808 A1*  8/2023    Atamli .................... G06F 21/53
                                                             718/1

* cited by examiner

FLOW 1600

1610
- ESTABLISH A SECURE COMMUNICATION SESSION WITH A DEVICE INTERFACE FOR AN I/O DEVICE RESIDENT ON A REMOTE HOST PLATFORM TO ENABLE MMIO BETWEEN A LOCAL TD AND A I/O DEVICE
  - RECEIVE A FIRST MESSAGE THAT INCLUDES A DEVICE INTERFACE HANDLE FOR THE I/O DEVICE
    1612
  - ESTABLISH THE SECURE COMMUNICATION SESSION VIA RECEIPT OF A CERTIFICATE MEASUREMENT FROM THE DEVICE INTERFACE TO VALIDATE THE DEVICE INTERFACE IN ORDER TO RECEIVE A REPORT THAT INDICATES CAPABILITIES OF THE DEVICE INTERFACE
    1614
  - ACCEPT THE CAPABILITIES OF THE DEVICE INTERFACE TO ENABLE MMIO BETWEEN THE LOCAL TD AND THE I/O DEVICE
    1616

1620
- CAUSE A SECURE RDMA SESSION OVER A NETWORK COMMUNICATION LINK TO BE SET UP BETWEEN A FIRST NIC RESIDENT ON THE HOST PLATFORM AND A SECOND NIC RESIDENT ON THE REMOTE HOST PLATFORM TO ENABLE DMA BETWEEN THE LOCAL TD AND THE I/O DEVICE
  - ACCEPT A DEVICE SERVICE TD FOR THE I/O DEVICE, THE DEVICE SERVICE TD MANAGED BY A SECOND TD MANAGER INCLUDED IN A SECOND HARDWARE PROCESSOR CORE RESIDENT ON THE REMOTE HOST PLATFORM, THE SECOND TD MANAGER TO MANAGE A HARDWARE ISOLATION OF THE DEVICE SERVICE TD
    1622
  - ESTABLISH A SECURE COMMUNICATION SESSION WITH THE DEVICE SERVICE TD
    1624
  - EXCHANGE AN RDMA KEY WITH THE DEVICE SERVICE TD VIA THE SECURE COMMUNICATION SESSION WITH THE DEVICE SERVICE TD
    1626
  - PROVIDE THE RDMA KEY TO THE FIRST NIC, FOR THE FIRST NIC TO ENCRYPT OR DECRYPT DMA MESSAGES RECEIVED VIA THE SECURE RDMA SESSION, WHEREIN THE DEVICE SERVICE TD IS TO PROVIDE THE RDMA KEY TO THE SECOND NIC, FOR THE FIRST NIC TO ENCRYPT OR DECRYPT DMA MESSAGES RECEIVED VIA THE SECURE RDMA SESSION
    1628

*FIG. 16*

**Storage Medium *1700***

*Computer Executable Instructions for 1600*

TECHNIQUES TO IMPLEMENT CONFIDENTIAL COMPUTING WITH A REMOTE DEVICE VIA USE OF TRUST DOMAINS

CLAIM OF PRIORITY

This application is a U.S. National Phase application under 35 U.S.C. § 371 of International Application No. PCT/CN2022/083920 filed Mar. 30, 2022. The entire contents of which are incorporated herein by reference.

TECHNICAL FIELD

Examples described herein are generally related to techniques associated with implementing confidential computing with a remote device via use of trust domains.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (IO). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

FIG. 16 illustrates an example logic flow.
FIG. 17 illustrates an example storage medium.

DETAILED DESCRIPTION

Figure 1:
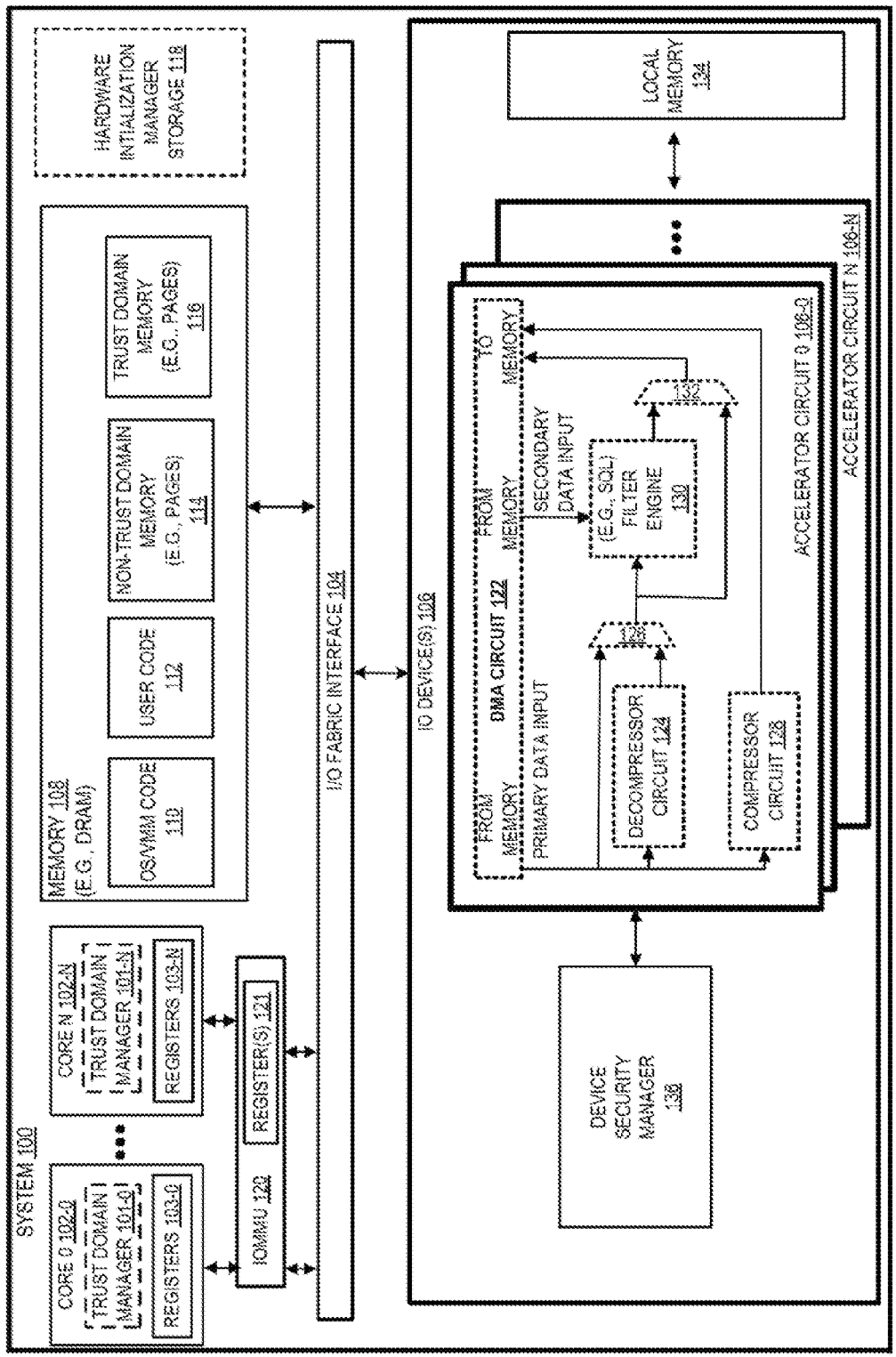
FIG. 1 illustrates an example first system.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. A system may include a plurality of cores, e.g., with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM) (e.g., an Intel® Optane™ memory), for example, accessible according to a Peripheral Component Interconnect Express (PCIe) specification such the PCIe Base Specification Revision 6.0, Ver. 1.0, published in January 2022 ("the PCIe specification").

In some examples of computing, a virtual machine (VM) (e.g., guest) is an emulation of a computer system. For these examples, VMs may be based on a specific computer architecture and provide the functionality of an underlying physical computer system. VM implementations may involve specialized hardware, firmware, software, or a combination. In certain examples, a virtual machine monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain examples. When installed over a host machine (e.g., processor) in certain examples, a VMM facilitates the creation of VMs, e.g., each with separate operating systems (OS) and applications. The VMM/hypervisor may manage the backend operation of these VMs by allocating the necessary computing, memory, storage, and other input/output (I/O) resources, such as, but not limited to, an input/output memory management unit (IOMMU). The VMM may provide a centralized interface for managing the entire operation, status, and availability of VMs that are installed over a single host machine or spread across different and interconnected hosts.

However, it may be desirable to maintain security (e.g., confidentiality) of information for a virtual machine from the VMM and/or other virtual machine(s). Certain processors (e.g., a system-on-a-chip (SoC) including a processor) utilize their hardware to isolate virtual machines, for example, with each referred to as a "trust domain". Certain processors support an instruction set architecture (ISA) (e.g., ISA extension) to implement trust domains. For example, Intel® trust domain extensions (Intel® TDX) that utilize architectural elements to deploy hardware-isolated VMs are referred to as trust domains (TDs).

According to some examples, a hardware processor and its ISA (e.g., a trust domain manager thereof) isolates TD VMs from the VMM/hypervisor and/or other non-TD software (e.g., on the host platform). For these examples, a hardware processor and its ISA (e.g., a trust domain manager thereof) implement TDs to enhance confidential computing by helping protect the TDs from a broad range of software attacks and reducing the TD trusted computing base (TCB). In certain examples, a hardware processor and its ISA (e.g., a trust domain manager thereof) enhances a cloud tenant's control of data security and protection. In some examples, a hardware processor and its ISA (e.g., a trust domain manager thereof) implement TDs (e.g., trusted VMs) to enhance a cloud-service provider's (CSP) ability to provide managed cloud services without exposing tenant data to adversaries.

In some examples, a hardware processor and its ISA (e.g., a trust domain manager thereof) also support device I/O. For example, with an ISA (e.g., Intel® TDX 2.0) supporting trust domain extensions (TDX) with device I/O (e.g., TDX-IO). For these examples, a hardware processor and its ISA (e.g., a trust domain manager thereof) that support device I/O (e.g., TDX-IO) enable the use (e.g., assignment) of a physical function (PF) and/or virtual function (VF) of a device to (e.g., only) a specific TD.

According to some examples, an I/O device is an accelerator. One or more types of accelerators may be utilized. For example, a first type of accelerator may be accelerator circuit, e.g., an In-Memory Analytics accelerator (IAX). A second type of accelerator supports a set of transformation operations on memory, e.g., a data streaming accelerator (DSA). For example, the accelerator is to generate and test cyclic redundancy check (CRC) checksum or Data Integrity Field (DIF) to support storage and networking applications and/or for memory compare and delta generate/merge to support VM migration, VM fast check-pointing, and software managed memory deduplication usages. A third type of accelerator supports security, authentication, and compression operations (e.g., cryptographic acceleration and compression operations), e.g., a QuickAssist Technology (QAT) accelerator.

In some examples, in order to establish a trust relationship between a device and a TD, certain TDX-IO architectures require the TD and/or a trust domain manager (e.g., circuit and/or code) (e.g., Trusted Execution Environment (TEE) security manager (TSM)) to create a secure communication session between the device and the trust domain manger (e.g., for the trust domain manger to allow a particular TD to use the device or a subset of function(s) of the device). For these examples, in order to establish the trust relationship between a device and a TD, certain TDX-IO architectures require the TD and/or a trust domain manager (e.g., circuit and/or code) (e.g., TSM) to use various specifications to include, but not limited to, a Distributed Management Task Force (DMTF) Secure Protocol and Data Model (SPDM) specification such as the SPDM specification, DSP0274, Ver. 1.0.1, published in March, 2021 by the Platform Management Components Intercommunication (PMCI) working group of the DMTF (hereinafter "the SPDM specification") to authenticate the device (e.g., and collect device measurement). The TD and/or trust domain manager may also use various specifications to include, but not limited to, specifications published by the Peripheral Component Interconnect Special Interest Group (PCI-SIG) and/or other specifications or standards that describe use of a Trusted Device Interface Security Protocol (TDISP) to communicate with a device security manager (DSM) to manage the device's virtual function(s).

According to some examples, a SPDM messaging protocol used according to the SPDM specification defines a request-response messaging model between two endpoints to perform a message exchange, for example, where each SPDM request message shall be responded to with an SPDM response message. For these examples, an endpoint's (e.g., device's) "measurement" describes the process of calculating a cryptographic hash value of a piece of firmware/software or configuration data and tying the cryptographic hash value with the endpoint's identity through a use of digital signatures. This allows an authentication initiator to establish that the identity and measurement of the firmware/software and/or a configuration currently running on the endpoint.

In some examples, to help enforce security policies for TDs, a new mode of a processor called Secure-Arbitration Mode (SEAM) is introduced to host (e.g., manufacturer provided) a digitally signed, but not encrypted, security-services module. For example, a trust domain manager (TDM) may be hosted in a reserved, memory space identified by a SEAM-range register (SEAMRR). For this example, the processor may only allow access to a SEAM-memory range by software executing inside the SEAM-memory range, and all other software accesses and direct-memory access (DMA) from devices to this SEAM-memory range are aborted. In some examples, a SEAM module does not have any memory-access privileges to other protected, memory regions in a compute/host platform, including the System-Management Mode (SMM) memory or (e.g., Intel® Software Guard Extensions (SGX)) protected memory.

Certain standards (e.g., specifications or standards that describe use of TDISP message protocols) introduce a TSM concept, but do not describe how to implement the TSM in a confidential computing environment, e.g., an environment implementing TDX-IO. According to some examples, one place to support a TSM is a trust domain manager of a processor (e.g., in a SEAM module), because it is independent of the other TDs and it can enforce the desired isolation.

It should be understood that the functionality described in this disclosure may be added to other confidential computing technologies as a computing solution for I/O devices. For example, AMD® Secure Encrypted Virtualization (e.g., SEV/SEV-ES/SEV-SNP) may use a certain component (e.g., a Platform Security Processor (PSP)) thereof to implement a TSM, for example, a whole TSM including two parts: (i) a trust domain manager that enforces the TEE isolation, and (ii) the PSP that handles communications with the device security manager (DSM). For example, ARM® Realm Management Extension (RME) may use a certain component (e.g., one ARM® core of a plurality of ARM® cores) thereof to implement a TSM, for example, a whole TSM including two parts: (i) a trust domain manager that enforces the TEE isolation, and (ii) the ARM® core that handles communications with the device security manager (DSM).

FIG. 1 illustrates an example system 100. System 100 may be a computer system to implement techniques associated with TDX-IO on a single host computer system (e.g., a host server). According to some examples, system 100 may have all the elements or components shown in FIG. 1 co-located on a same physical machine (e.g., same host server or platform). In other words, the components of system 100 shown in FIG. 1 are located locally (e.g., same host server) as compared to at least some other components of system 100 (e.g., an I/O device from among I/O device(s) 106) being remotely located. For these examples, as shown in FIG. 1, system 100 includes a plurality of cores 102-0 to 102-N (e.g., where N is any positive integer greater than one, although single core examples may also be utilized) having a trust domain manager 101-0 to 101-N, a memory 108 (e.g., a system memory separate from a processor and/or core memory), an input/output memory management unit (IOMMU) 120 (e.g., circuit), and one or more input/output (IO) device(s) 106.

In some examples, as shown in FIG. 1, each core of cores 102-0 to 102-N includes (e.g., or logically includes) a set of registers, e.g., registers 103-0 for core 102-0, registers 103-N for core 102-N, etc. Registers 103 may be data registers and/or control registers, e.g., for each core (e.g., or each logical core of a plurality of logical cores of a physical core).

According to some examples, I/O device(s) 106 includes one or more accelerators (e.g., accelerator circuits 106-0 to 106-N (e.g., where N is any positive integer greater than one, although single accelerator circuit examples may also be utilized)).

Although the example shown in FIG. 1 of I/O device(s) 106 indicates an accelerator circuit, it should be understood that other types of devices (e.g., non-accelerator devices) are contemplated by this disclosure (e.g., storage or memory devices). In the depicted example, an (e.g., each) accelerator circuit 106-0 to 106-N of I/O device(s) 106 includes a decompressor circuit 124 to perform decompression operations, a compressor circuit 128 to perform compression operations, and a direct memory access (DMA) circuit 122, e.g., to connect to memory 108 and/or internal memory (e.g., cache) of a core. In one example, compressor circuit 128 is (e.g., dynamically) shared by two or more accelerator circuits 106-0 to 106-N. In some examples, data for a job that is assigned to a particular accelerator circuit (e.g., accelerator circuit 106-0) is streamed in by DMA circuit 122, for example, as primary and/or secondary input. Multiplexers 126 and 132 may be utilized to route data for a particular operation. Optionally, a (e.g., Structured Query Language (SQL)) filter engine 130 may be included, for example, to perform a filtering query (e.g., for a search term input on the secondary data input) on input data, e.g., on decompressed data output from decompressor circuit 124. I/O device(s) 106 may include a local memory 134, e.g., shared by a plurality of accelerator circuits 106-0 to 106-N. In some examples, system 100 may couple to a hard drive, e.g., data storage 2028 in FIG. 20.

Memory 108 may include operating system (OS) and/or virtual machine monitor (VMM) code 110, user (e.g., program) code 112, non-trust domain memory 114 (e.g., pages), trust domain memory 116 (e.g., pages), uncompressed data (e.g., pages), compressed data (e.g., pages), or any combination thereof. In some examples of computing, a VM is an emulation of a computer system. In some examples, VMs are based on a specific computer architecture and provide the functionality of an underlying physical computer system. VM implementations may involve specialized hardware, firmware, software, or a combination. In some examples, a VMM (also known as a hypervisor) may be a software program that, when executed, enables the creation, management, and governance of VM instances and manages the operation of a virtualized environment on top of a physical host machine. A VMM is the primary software behind virtualization environments and implementations in certain examples. When installed over a host machine (e.g., processor) in certain examples, a VMM facilitates creation of VMs, e.g., each with separate OSs and applications. The VMM may manage the backend operation of these VMs by allocating the necessary computing, memory, storage, and other I/O resources, such as, but not limited to, an IOMMU (e.g., IOMMU 120). The VMM may provide a centralized interface for managing the entire operation, status, and availability of VMs that are installed on a host machine that includes system 100.

According to some examples, memory 108 may be memory separate from a core and/or I/O device(s) 106. Memory 108 may include volatile types of memory such as, but not limited to, DRAM or static random access memory (SRAM). Compressed data may be stored in a first memory device (e.g., configured as far memory) and/or uncompressed data may be stored in a separate, second memory device (e.g., configured as near memory).

In some examples, a coupling (e.g., via input/output (I/O) fabric interface 104) may be included to allow communication between I/O device(s) 106, core(s) 102-0 to 102-N, memory 108, etc.

According to some examples, a hardware initialization manager (non-transitory) storage 118 may store hardware initialization manager firmware (e.g., or software). In some examples, hardware initialization manager (non-transitory) storage 118 stores Basic Input/Output System (BIOS) firmware. In other examples, hardware initialization manager (non-transitory) storage 118 may store Unified Extensible Firmware Interface (UEFI) firmware. In certain examples (e.g., triggered by the power-on or reboot of a processor), computer system 100 (e.g., core 102-0) executes the hardware initialization manager firmware (e.g., or software) stored in hardware initialization manager (non-transitory) storage 118 to initialize the system 100 for operation, for example, to begin executing an operating system (OS) and/or initialize and test the (e.g., hardware) components of system 100.

In some examples, system 100 includes an I/O memory management unit (IOMMU) 120 (e.g., circuitry), e.g., coupled between one or more cores 102-0 to 102-N and IO fabric interface 104. In certain examples, IO fabric interface is a Peripheral Component Interface Express (PCIe) interface or a Compute Express Link (CXL) interface. In certain examples, IOMMU 120 provides address translation, for example, from a virtual address to a physical address. In certain examples, IOMMU 120 includes one or more registers 121, for example, data registers and/or control registers.

According to some examples, I/O device(s) 106 may include any of the depicted components. For example, with one or more instances of an accelerator circuit 106-0 to 106-N. In certain examples, a job (e.g., corresponding descriptor for that job) is submitted to and I/O device from among I/O device(s) 106 and the I/O device is to perform one or more (e.g., decompression or compression) operations. Also, I/O device(s) 106 may be a TEE capable I/O device, for example, with the host (e.g., processor including one of more of cores 102-0 to 102-N) being a TEE capable host. In certain examples, a TEE capable host implements a TSM.

In some examples, a TSM (e.g., implemented by a trust domain manager 101) is to: provide interfaces to the VMM to assign memory, processor, and other resources to TDs (e.g., trusted virtual machines), (ii) implement the security mechanisms and access controls (e.g., IOMMU translation tables, etc.) to protect confidentiality and integrity of the TDs' (e.g., trusted virtual machines) data and execution state in the host from entities not in the trusted computing base of the TDs (e.g., trusted virtual machines), (iii) uses a protocol to manage the security state of the trusted device interface (TDI) to be used by the TDs (e.g., trusted virtual machines), (iv) establish/manage integrity and data encryption (IDE) keys for the host, and, if needed, schedule IDE key refreshes.

For these examples, the TSM programs the IDE encryption keys into the host root ports and communicates with a devices security manager (DSM) at the TEE capable I/O device (e.g., DSM 136 of I/O device(s) 106) to configure IDE encryption keys in the TEE capable I/O device, (v) or any single or combination thereof.

According to some examples, DSM 136 is to (i) support authentication of I/O device(s) 106 identities and measurement reporting, (ii) configure IDE encryption keys in I/O device(s) 106 (e.g., where a TSM provide the keys for the initial configuration and subsequent key refreshes to a DSM), (iii) provide device interface management for locking TDI configuration, reporting TDI configurations, attaching, and detaching TDIs to TDs (e.g., trusted virtual machines), (iv) implements access control and security mechanisms to isolate TDs (e.g., trusted virtual machine) provided data from entities not in the TCB of a TD (e.g., a trusted virtual machine), (v) or any single or combination thereof.

In some examples, a standard or specification defines a virtual machine monitor (VMM) (e.g., or VM thereof), TSM (e.g., trust domain manager 101), and device security manager (DSM) 136 interaction flow. The standard or specification may include, but is not limited to, a specification published by Intel® entitled "Architecture Specification: Intel® Trust Domain Extensions (Intel® TDX) Module", published in August 2021 ("TDX-IO architecture specification") and/or other standards or specification related to this Intel® TDX specification.

According to some examples, IOMMU 120 and trust domain manager(s) 101 cooperate to allow for direct memory access (e.g., directly) between (e.g., to and/or from) I/O device(s) 106 and trust domain memory 116 (e.g., a region for only a single trust domain and/or another region shared by a plurality of trust domains).

In some examples, in order to establish a trust relationship between an I/O device such as an I/O device from among I/O device(s) 106 and a TD, certain TDX-IO architectures require the TD and/or a trust domain manager (e.g., circuit and/or code) (e.g., Trusted Execution Environment (TEE) security manager (TSM)) to create a secure communication session between the I/O device and the trust domain manger (e.g., for the trust domain manger to allow a particular TD to use the I/O device or a subset of function(s) of the I/O device). In order to establish the trust relationship between an I/O device and a TD, certain TDX-IO architectures require the TD and/or a trust domain manager (e.g., circuit and/or code) (e.g., TSM) use (i) the SPDM specification to authenticate the device (e.g., and collect device measurement), and (ii) use TDISP as described in PCI-SIG published standards or specification to communicate with a DSM (e.g., DSM 136) to manage the I/O device's function(s).

Figure 2:
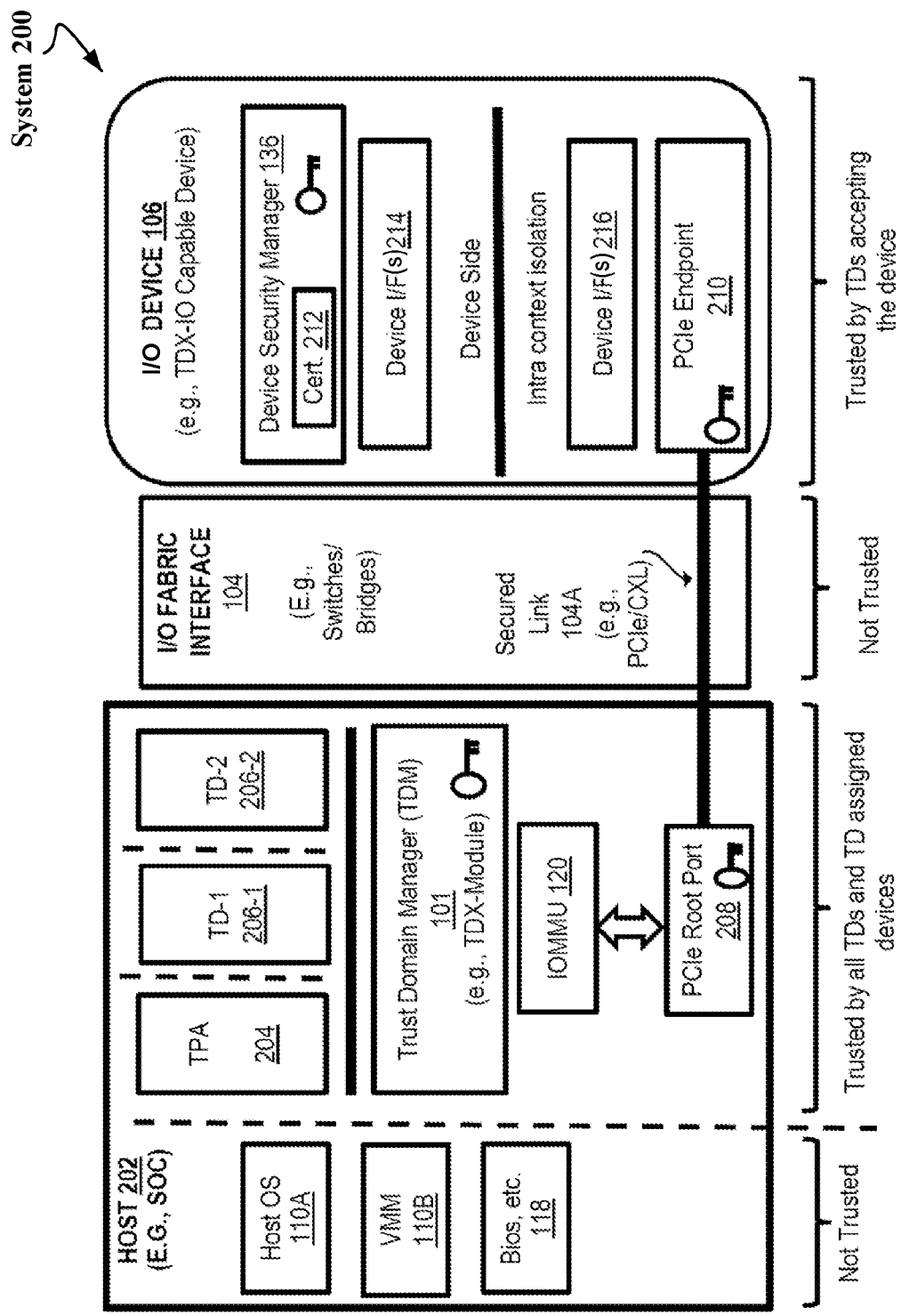
FIG. 2 illustrates an example second system.

FIG. 2 illustrates an example system 200. As shown in FIG. 2, system 200 includes a host 202 (e.g., a system on a chip (SOC)). Host 202, for example, may be one or more processor cores (e.g., cores 102-0 to 102-N shown in FIG. 1) coupled to an I/O device 106 according to examples of this disclosure. As mentioned above for system 100, system 200 may also be part of a computer system that implement techniques associated with TDX-IO and system 200 may also be on a single host computer system (e.g., a host server or platform).

According to some examples, host 202 implements TDX-IO provisioning agent (TPA) 204 and a plurality of TDs, shown as TD-1 206-1 and TD-2 206-2, although any single or plurality of TDs may be implemented. In some examples, as shown in FIG. 2, Host 202 includes a trust domain manager (TDM) 101 (also referred to as a TDX-module) to manage the plurality of TDs (for example, with the vertical dashed lines of FIG. 2 indicating isolation therebetween TDs and host OS 110A, VMM 110B, and BIOS 118.

In some examples, VMM 110B manages (e.g., generates) one or more VMs, e.g., with the trust domain manager 101 isolating a first VM as a first TD (e.g., TD-1 206-1) from a second (or more) VM and second (or more) TD(s) (e.g., TD-2 206-2).

According to some examples, host 202 includes a (e.g., PCIe) root port 208 having a key (shown symbolically in FIG. 2) to allow secure communications with I/O device 106, e.g., with the (e.g., PCIe) endpoint 210 thereof (e.g., also having the key (shown symbolically in FIG. 2)). In some examples, trust domain manager 101 and device security manager 136 are also to have a key, e.g., representing a memory protection key and a secure session key, respectively.

In some examples, host 202 is coupled to I/O device 106 via an I/O interface 104 as shown in FIG. 2. For these example, the coupling via I/O interface 104 may include a secured link 104A that may be established and/or maintained according to a PCIe and/or CXL specification. A CXL specification, for example, may include the Compute Express Link Specification, Rev. 2.0, Ver. 1.0, published Oct. 26, 2020, hereinafter referred to as "the CXL specification".

According to some examples, host 202 may be coupled to one or more device interface(s) (I/F(s)) 216 of I/O device 106 according to a transport level specification (e.g., the SPDM specification) and/or an application level (e.g., TDISP) specification. In some examples, DSM 136 of I/O device 106 may maintain device secret(s) (e.g. session key) or device public properties (e.g., device certificate 212, device "measurement" values, etc.). In some examples, I/O device 106 may implement one or more physical function(s).

In some examples, as shown in FIG. 2, I/O device 106 includes one or more device I/F(s) 214 on a device side, and one or more device interface(s) 216 that is isolated from device I/F(s) 214 via an intra context isolation supported by I/O device 106.

According to some examples, I/O device 106 (e.g., according to a single-root input/output virtualization (SR-IOV) standard) may be shared by a plurality of VMs (e.g., arranged in respective TDs). For these examples, a physical function has an ability to move data in and out of an I/O device while virtual functions (for example, first virtual function and second virtual function, e.g., where the virtual functions are lightweight (e.g., PCIe) functions that support data flowing but also have a restricted set of configuration resources.

In some examples, I/O device 106 may perform a direct memory access (DMA) request to a private memory of a TD (e.g., TD-1 206-1 or TD-2 206-2) under the control of IOMMU 120.

In some examples, a TD has both a private memory (e.g., in trust domain memory 116—see FIG. 1) and a shared memory (e.g., in non-trust domain memory 114 and/or trust domain memory 116—see FIG. 1). In some examples, direct memory accesses (DMAs) may target protected memory (e.g., private memory) or shared memory of a TD.

According to some examples, a system such as system 200 that has a TD such as TD-1 206-1 establishes a trusted connection via a secured link such as secured link 104A with an I/O device such as I/O device 106 according to the SPDM specification and the TDX-IO architecture specification.

Also, a trusted device interface security protocol (TDISP) may be used to manage the I/O device and enable memory-mapped I/O (MMIO) and direct memory access (DMA) with the I/O device. Also, an integration and data encryption (IDE) protocol may be used in accordance with the PCIe specification and/or the CXL specification to secure a link between the I/O device and a root port (e.g., PCIe root port 208) at the host supporting the TD.

A TDX-IO architecture, as described above, provides a solution for a trusted environment when a host supporting a TD and an I/O device are located on a same physical machine. However, the above-described TDX-IO architecture does not provide a solution for a disaggregated data center, where an I/O device and a host supporting a TD may be resident on different physical machines. For example, the I/O device and the host supporting the TD may be located on separate physical servers that are coupled via a network. Remote-DMA (RDMA) protocols such as those described by the RDMA over Converged Ethernet (RoCE) or Infini-Band over Ethernet (IBoE) specifications may be used, where an application may pass the data buffer to an RDMA enabled network interface card (NIC) and allow the application to read the data buffer directly, without central processing unit (CPU) interaction in a kernel mode. RDMA messages may be protected via a standard network security protocol such as ROCE using datagram transport layer security (DTLS) protocols or RoCE using iWARP protocols or using a proprietary secure RDMA (sRDMA) protocol. However, these various uses of RDMA for secure RDMA between a host and a remotely located I/O device are not based on the same type of trusted environment as described above for system 100 or system 200. In other words, these solutions do not describe how to use RDMA for a confidential computing environment.

Figure 3:
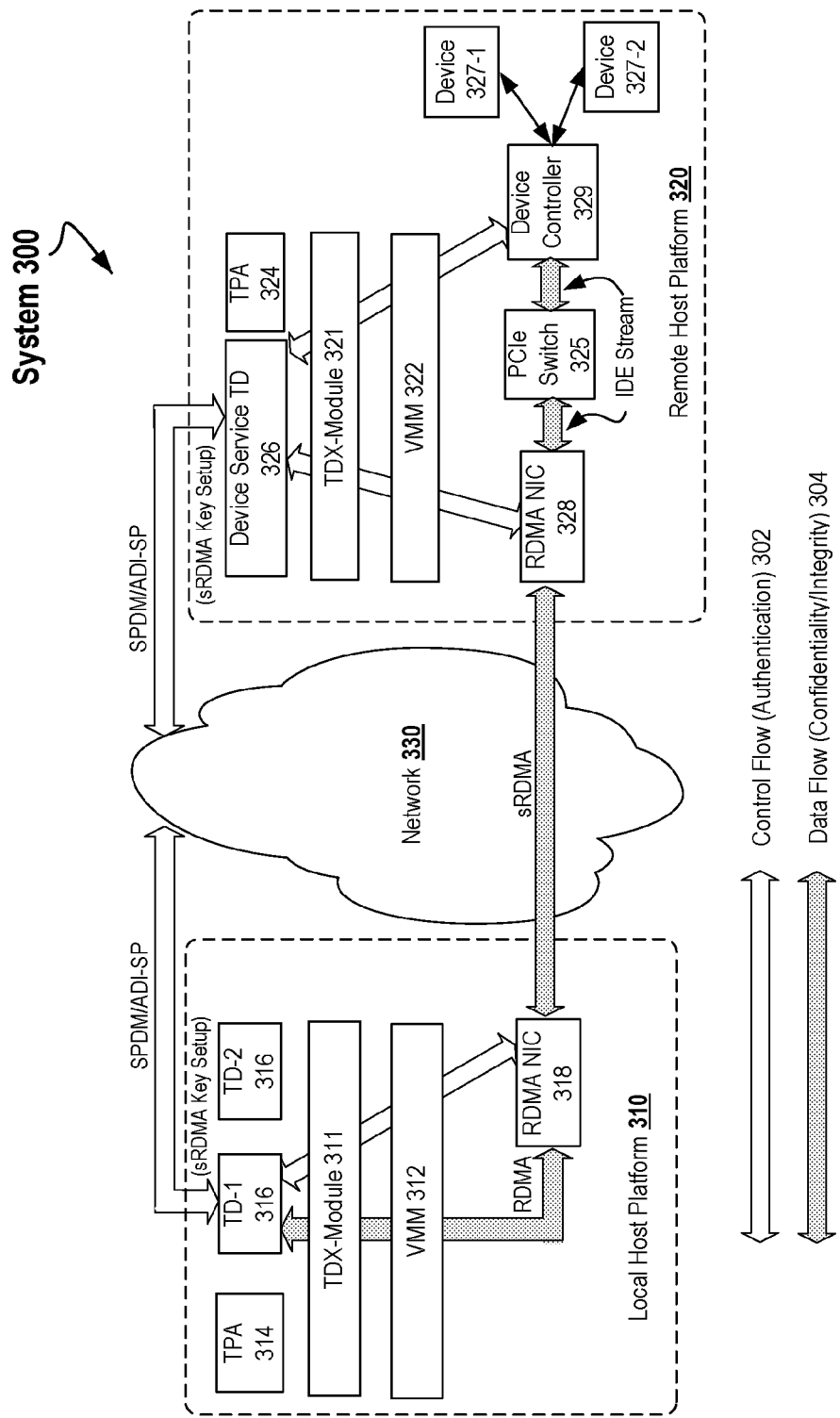
FIG. 3 illustrates an example third system.

FIG. 3 illustrates an example system 300. In some examples, as shown in FIG. 3, system 300 includes a local host platform 310 communicatively coupled with a remote host platform 320 via a network 330. As described more below, a device controller for an I/O device such as a device controller 329 for a device 323 or 327 at remote host platform 320 may be brought into a TD trusted boundary with a TD hosted by local host platform 310 such as TD-1 316 or TD-2 316. For these examples, as shown in FIG. 3, local host platform 310 and remote host platform 320 are TEE capable hosts and include similar components to protect confidentiality and integrity of TD's as described above for systems 100 and 200 shown in FIGS. 1-2. For example, local host platform 310 includes a TPA 314 and a TDX-module 311 to provision and manage TD-1 316 and TD-2 316 and to facilitate communication between a VMM 312 and these TDs. Also, remote platform 320 includes a TPA 324 and a TDX-module 321 to provision and manage a device service TD 326 and to facilitate communication between a VMM 322 and device service TD 326. In some examples TDX-module 311 may function in a similar manner as TSM 101 described above for systems 100 and 200 and shown in FIGS. 1-2 to manage TD-1 316 and TD-2 316.

According to some examples and as described in more detail below, in a TDX-IO environment, there may be two steps to use a remote I/O device. A first step includes a remote I/O device assignment by a VMM at a local host platform, where a VMM such as VMM 312 assigns a device interface for the remote I/O device such as device 327 to a TD such as TD-1 316, and the TD needs to accept the device assignment after the TD verifies its identity and measurement via a control flow that is shown in FIG. 3 as control flow 302 that includes use of SPDM and TDISP to eventually enable MMIO communications between TD-1 316-1 and device 327 and/or a device interface for device 327. A second step includes a remote I/O device runtime, where the TD may enable use of DMA reads or writes to a remote I/O device via a data flow that is shown in FIG. 3 as data flow 304. Data flow 304, for example, may be routed through RDMA NICs 318 and 328 and may use a secure RDMA (sRDMA) session over a communication link of network 330 to enable use of DMA. The setting of an sRDMA session is described in more detail below.

In some examples, a remote I/O device may include, but is not limited to, an accelerator device, a memory device or a storage device. For these examples, a memory or storage device may include volatile and/or non-volatile types of memory.

Figure 4:
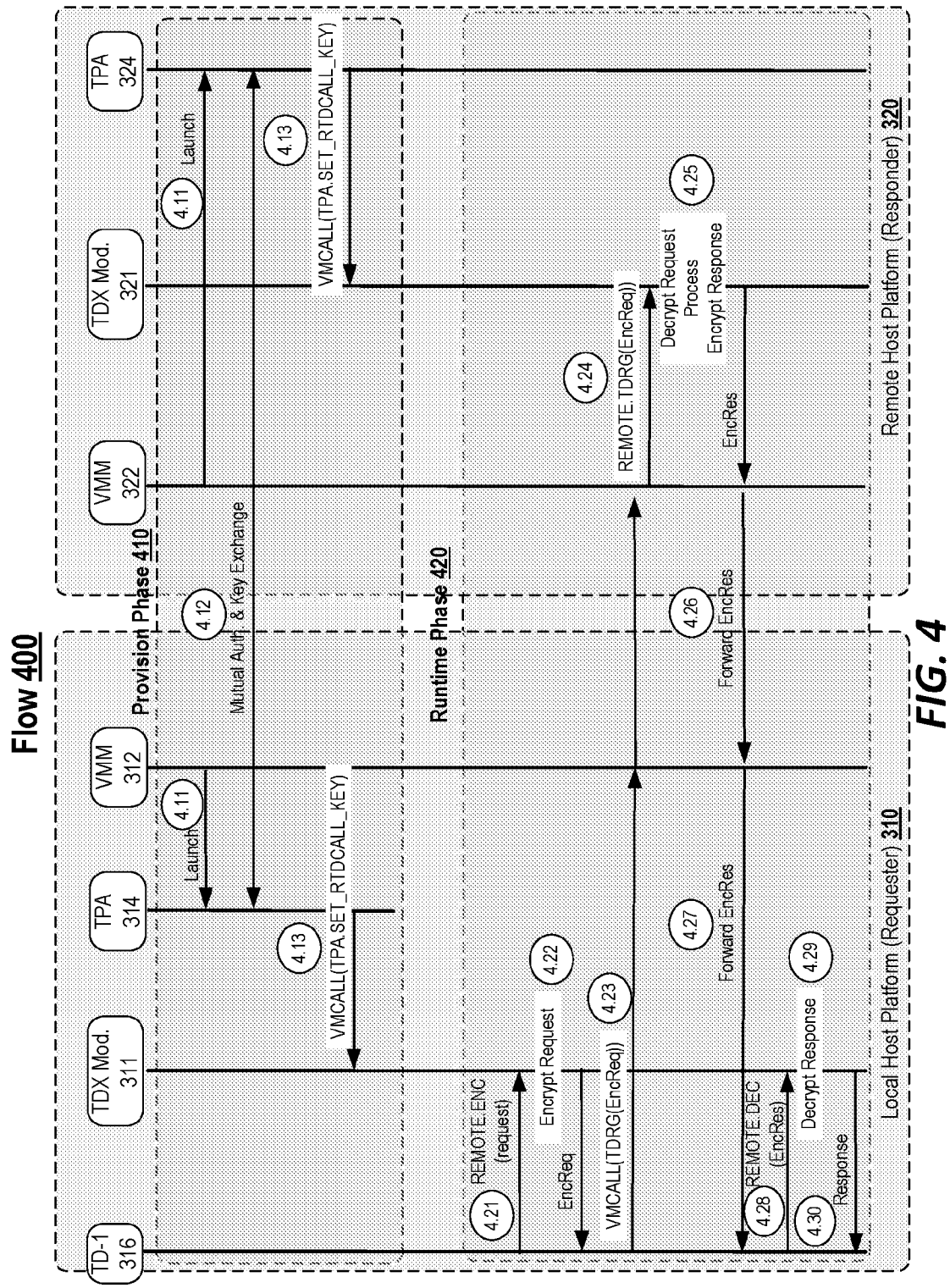
FIG. 4 illustrates an example first flow for use of a first primitive.

FIG. 4 illustrates an example flow 400 for use of a remote TDCALL primitive. According to some examples, as shown in FIG. 4, local host platform 310 is indicated as a requester and remote host platform 320 is indicated as a responder. For these examples, flow 400 is broken in two parts, a provision phase 410 and a runtime phase 420. In some examples, a local TD such as TD-1 316 may call a remote TDX module such as TDX-module 321 to get some information. Because VMMs are not trusted in a TDX-IO environment, messages between TD-1 316 and TDX-module 321 need to be encrypted.

In some examples, at 4.11 of provision phase 410, VMM 312 launches TPA 314 at local host platform 310 and VMM 322 launches TPA 324 at remote host platform 320. For these examples, the launch of the respective TPAs may occur after a system boot.

According to some examples, at 4.12 of provision phase 410, TPA 314 and TPA 324 perform a mutual authentication of each other to setup a secure session and then exchange a shared key. For these examples, the shared key is indicated in flow 400 as "RTDCALL_Key".

In some examples, at 4.13 of provision phase 410, TPA 314 sets the RTDCALL_Key to TDX-module 311 and TPA 324 sets the RTDCALL_key to TDX-module 321. For these examples, each of the TDX modules now have the same RTDCALL_key.

According to some examples, at 4.21 of runtime phase 420, TD-1 316 initiates a remote TDCALL as shown in Flow 400 by a REMOTE.ENC(request) message to TDX-module 311. For these examples, the remote TDCALL may request information from TDX-module 321.

In some examples, at 4.22 of runtime phase 420, TDX-module 311 encrypts the request received from TD-1 316 and sends the encrypted request to TD-1 316. For these examples, TDX-module 311 encrypts the request with the RTDCALL_Key.

According to some examples, at 4.23 of runtime phase 420, TD-1 316 uses a VMCALL(TDRG(EncReq)) message to let VMM 312 send the VMCALL(TDRG(EncReq)) message to VMM 322. For these examples, the message includes the request encrypted with the RTDCALL_Key as described above for 4.22.

In some examples, at 4.24 of runtime phase 420, when VMM 322 receives the VMCALL(TDRG(EncReq)) message from VMM 312, VMM 322 uses a REMOTE.TDRG (EncReq) message to forward the encrypted request to TDX-module 321. For these examples, VMM 322 may use a SEAMCALL REMOTE.TDRG(EncReq) message to forward the encrypted request.

According to some examples, at 4.25 of runtime phase 420, TDX-module 321 decrypts the encrypted request and processes an encrypted response. For these examples, the exchanged RTDCALL_Key is used to decrypt the request and then to encrypt a response.

In some examples, at 4.26 of runtime phase 420, when VMM 322 receives the encrypted response from TDX-module 321, VMM 322 forwards the encrypted response to VMM 312.

According to some examples, at 4.27 of runtime phase 420, VMM 312 forwards the response to TD-1 316.

In some examples, at 4.28 of runtime phase 420, TD-1 316 issues and sends REMOTE.DEC(EncRes) message to TDX-module 311 to ask TDX-module 311 to decrypt the encrypted response from TDX-module 321.

According to some examples, at 4.29 of runtime phase 420, TDX-module 311 decrypts the response. For these examples, the exchanged RTDCALL-Key is used to decrypt the encrypted response.

In some examples, at 4.30 of runtime phase 420, TDX-module 311 sends the response to TD-1 316. For these examples, the response may include information requested by TD-1 316 to TDX-module 321. Flow 400 then comes to an end.

Figure 5:
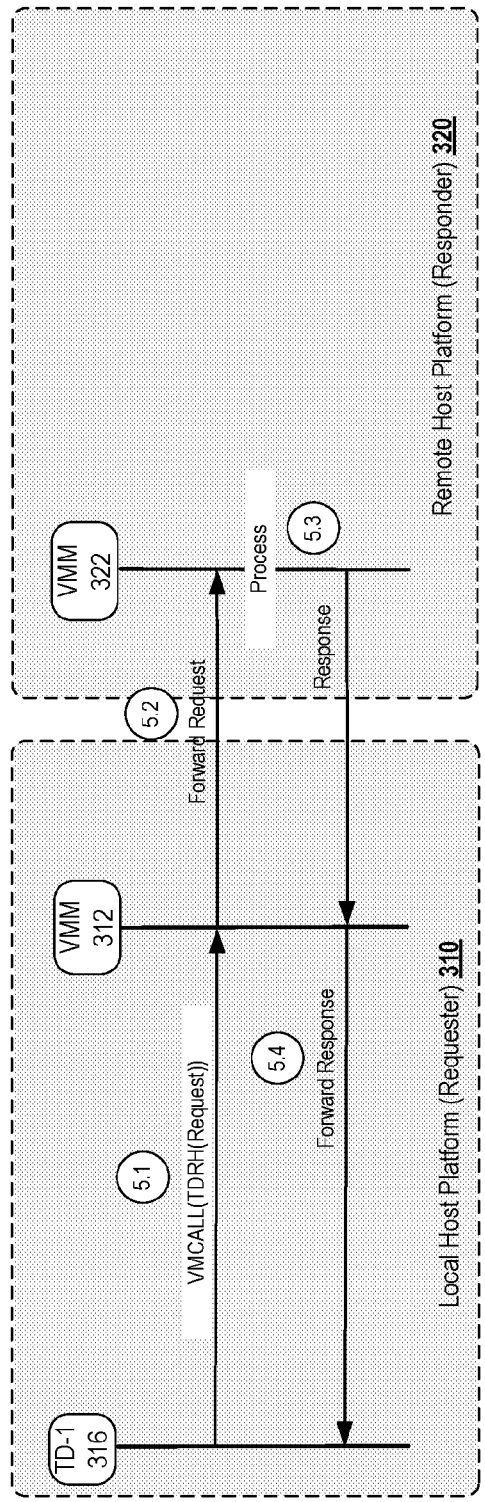
FIG. 5 illustrates an example second flow for use of a second primitive.

FIG. 5 illustrates an example flow 500 for use of a remote TDVMCALL primitive. According to some examples, as shown in FIG. 5, local host platform 310 is indicated as a requester and remote host platform 320 is indicated as a responder. For these examples, TD-1 316 uses the remote TDVMCALL primitive to get some information from VMM 322 located at remote host platform 320.

In some examples, at 5.1, TD-1 316 creates a request via issuance of a VMCALL(TDRH(request)) message that is sent to VMM 312.

According to some examples, at 5.2, VMM 312 forwards the request included in VMCALL(TDRH(request)) message to VMM 322.

In some examples, at 5.3, VMM 322 processes the received request and sends a response to VMM 312.

According to some examples, at 5.4, VMM 312 forwards the response to TD-1 316. For these examples, the response may include information requested by TD-1 316. Flow 500 then comes to an end.

Figure 6:
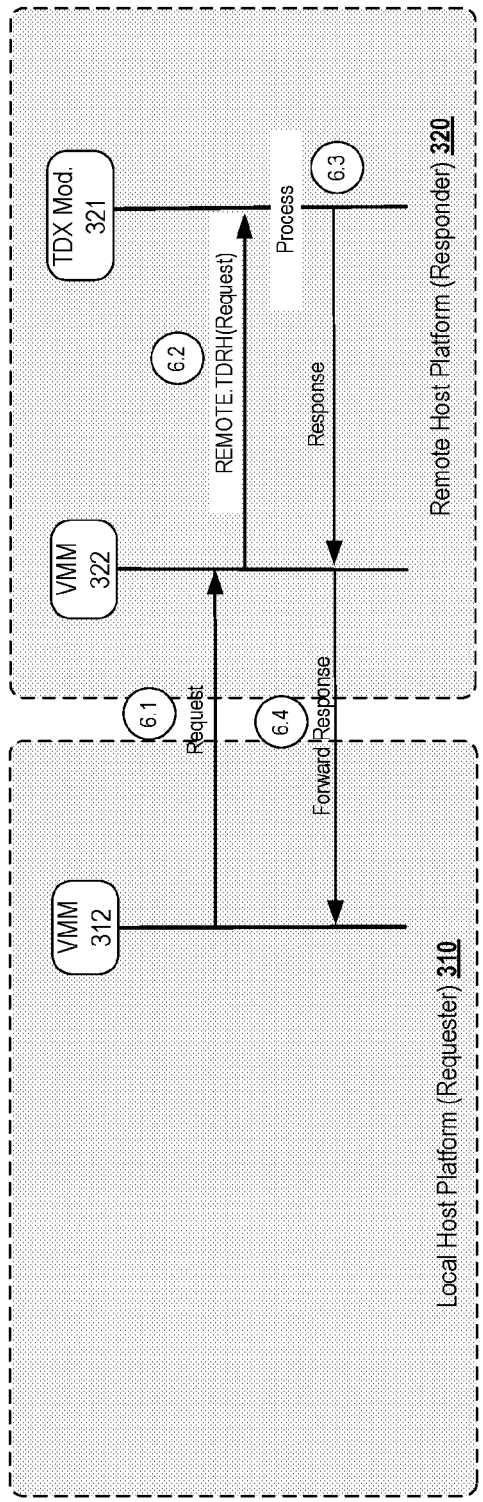
FIG. 6 illustrates an example third flow for use of a third primitive.

FIG. 6 illustrates an example flow 600 for use of a remote SEAMCALL primitive. In some examples, as shown in FIG. 6, local host platform 310 is indicated as a requester and remote host platform 320 is indicated as a responder. For these examples, VMM 312 uses the remote SEAMCALL primitive to get some information from TDX-module 321 located at remote host platform 320.

According to some examples, at 6.1, VMM 312 sends a request to VMM 322. For these examples, the request may be for VMM 322 to send a SEAMCALL message to TDX-module 321 to get information from TDX-module 321.

In some examples, at 6.2, when VMM 322 receives the request, VMM 322 generates a REMOTE.TDRH(Request) message and sends this message to TDX-module 321 For these examples, the REMOTE.TDRH(Request) message may serve as a type of remote SEAMCALL message.

According to some examples, at 6.3, TDX-module 321 processes the REMOTE.TDRH(Request) message and returns a response.

In some examples, at 6.4, VMM 322 forwards the response to VMM 312. For these examples, the response may include information requested by VMM 312. Flow 600 then comes to an end.

Figure 7:
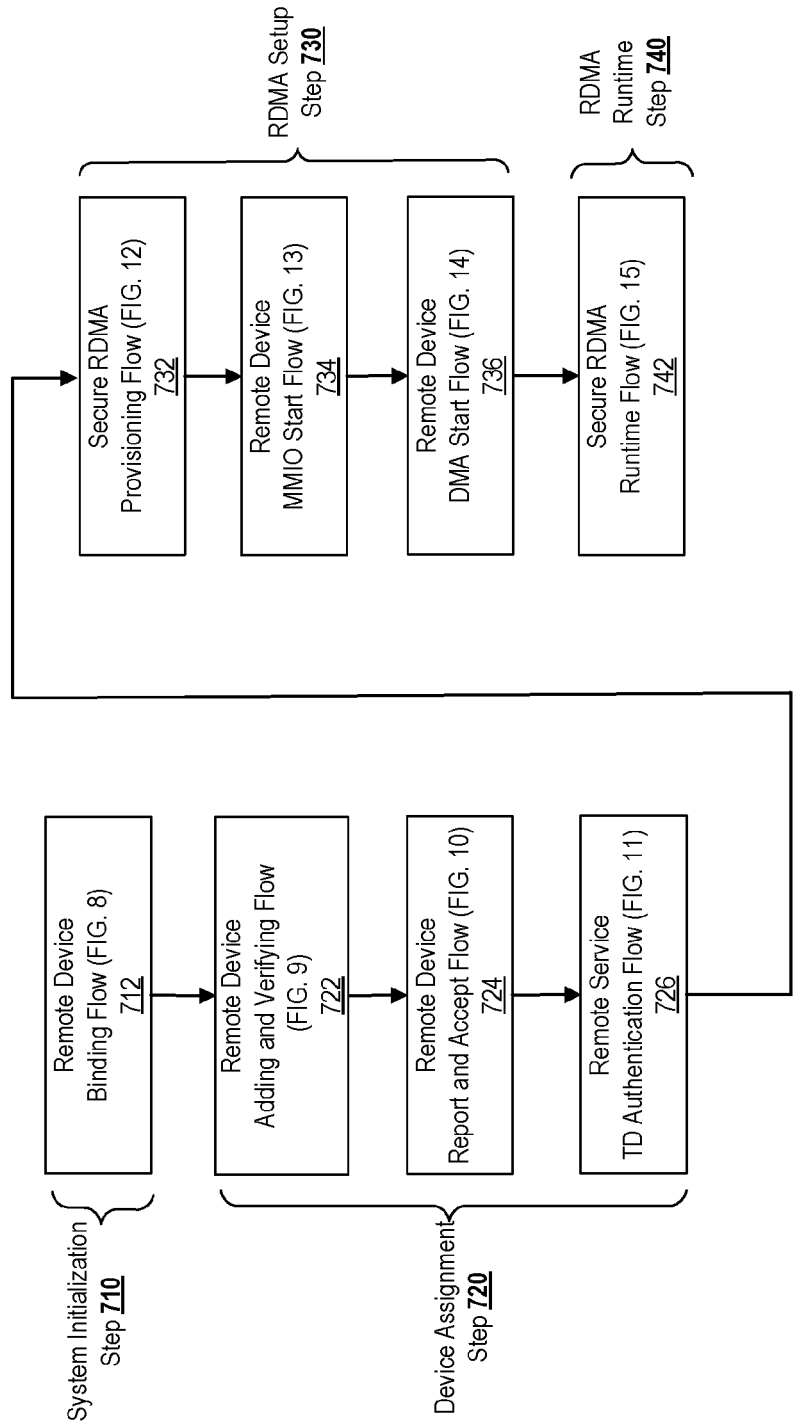
FIG. 7 illustrates an example system flow.

FIG. 7 illustrates an example system flow 700. According to some examples, system flow 700 provides an overview of various steps that abstract three example primitives described above in FIGS. 4-6 that include a remote TDCALL primitive, a remote TDVMCALL primitive and a remote SEAMCALL primitive to extend a TDX-IO architecture from just a local machine to a local and a remote machine. For these examples, as shown in FIG. 7, various steps include a system initialization step 710, a device assignment step 720, an RDMA setup step 730 and an RDMA runtime step 740. Each step may include one or more flows involving various actions by components of a system implementing the TDX-O architecture. The components may include, but are not limited to, components described above for system 300.

Figure 8:
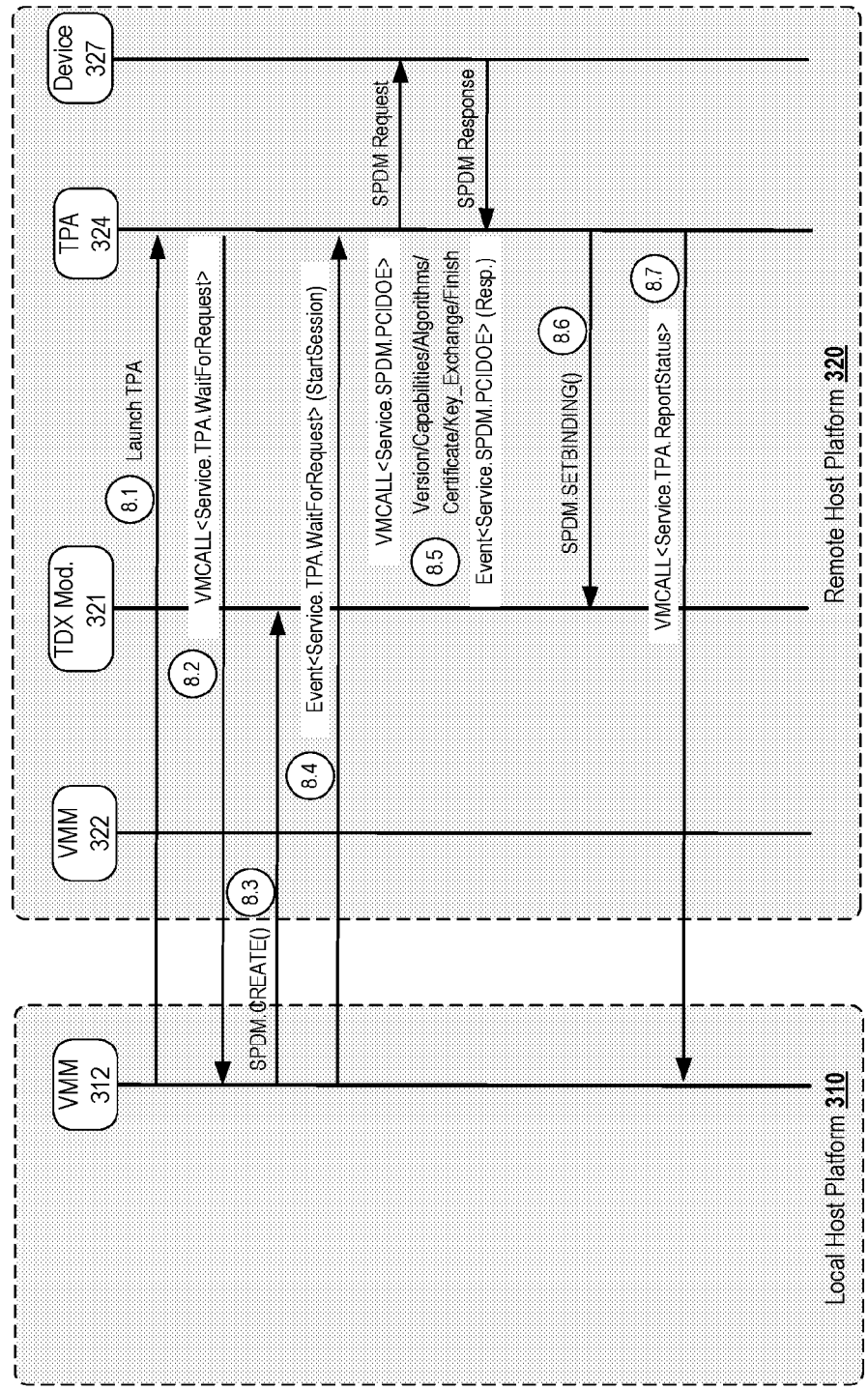
FIG. 8 illustrates an example first flow of the system flow.

In some examples, as shown in FIG. 7, system initialization step 710 includes a remote device binding flow 712 (see FIG. 8).

Figure 10:
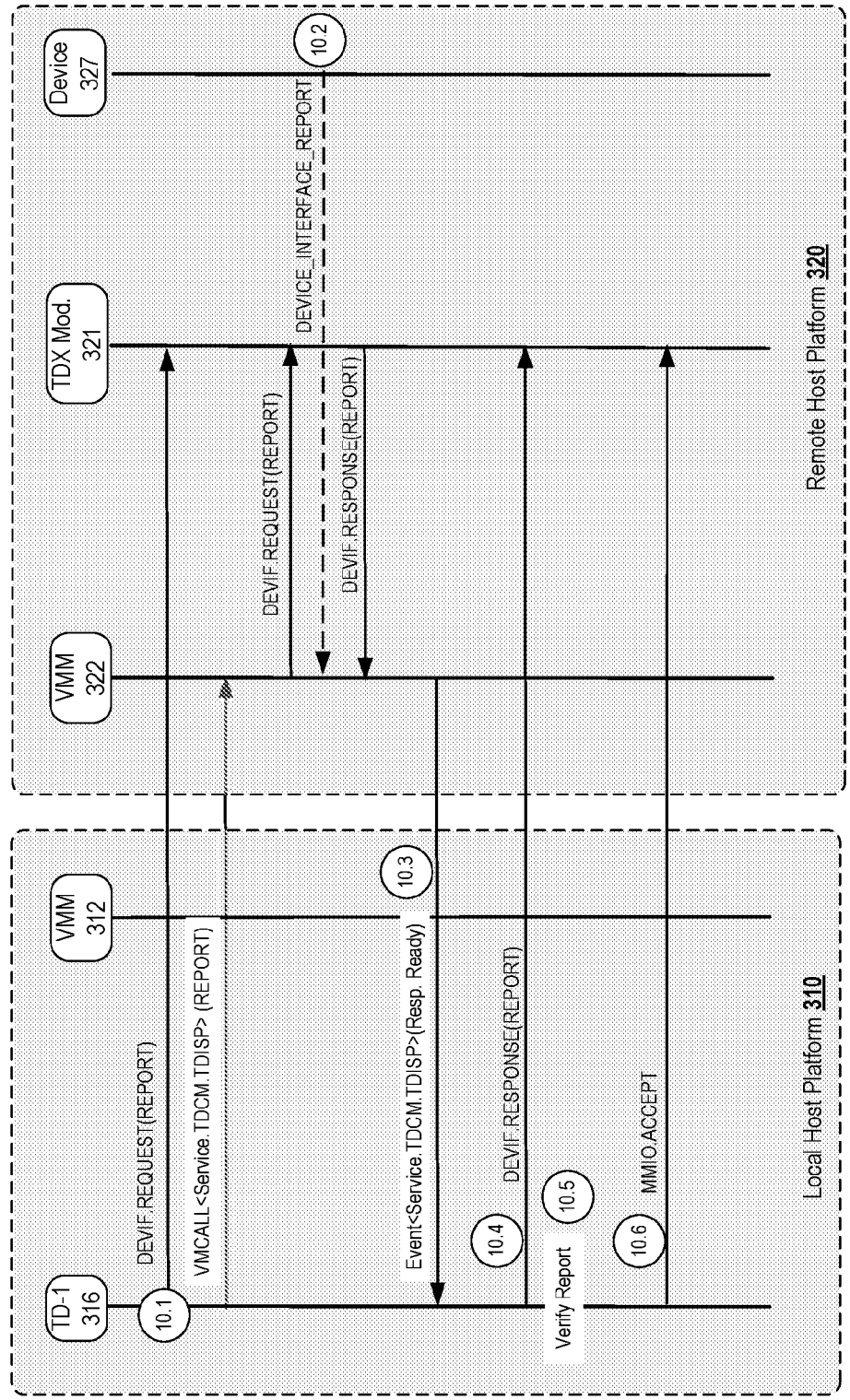
FIG. 10 illustrates an example first flow of the system flow.
Figure 11:
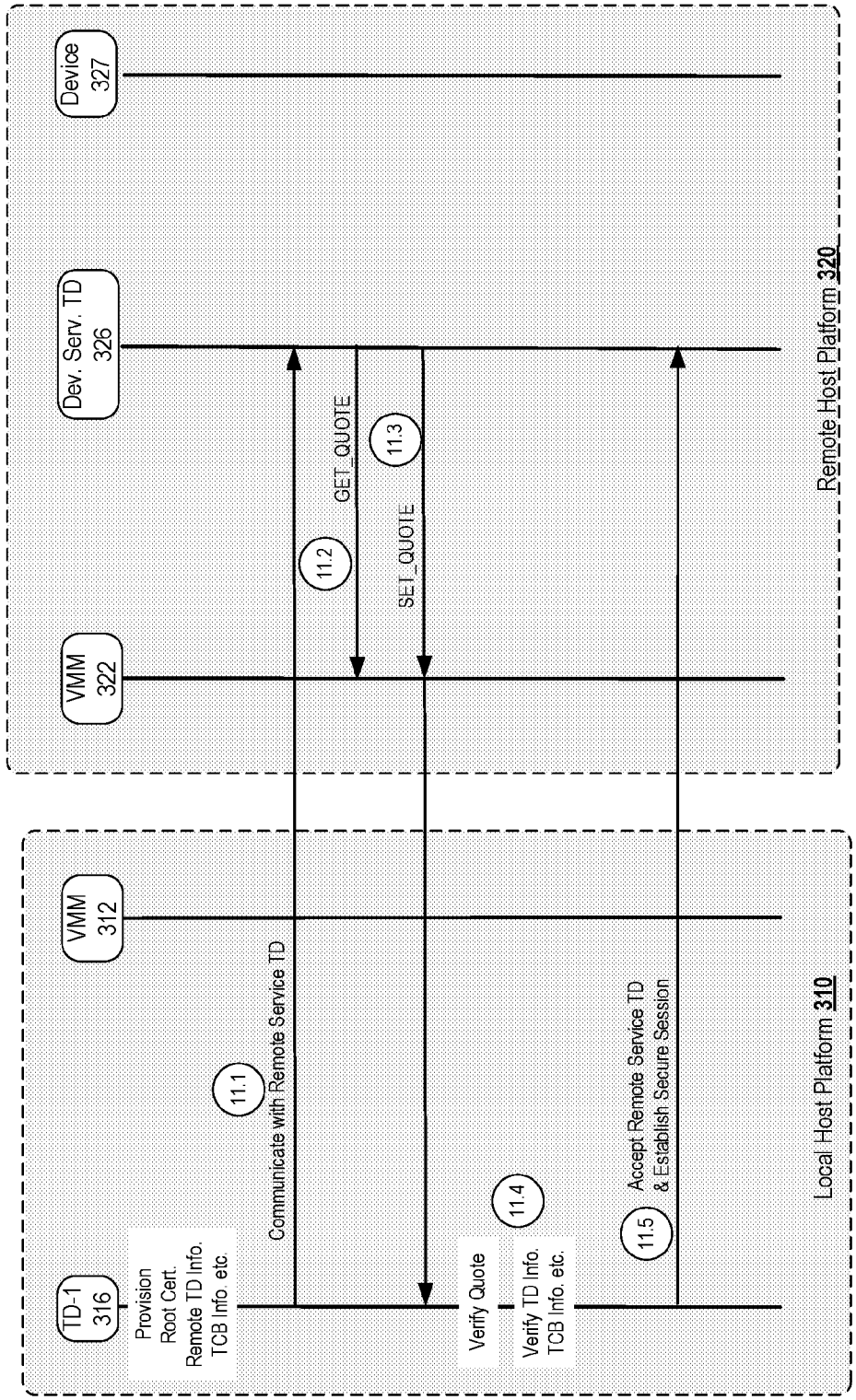
FIG. 11 illustrates an example first flow of the system flow.

According to some examples, as shown in FIG. 7, device assignment step 720 includes a remote device adding and verifying flow 722 (see FIG. 9), a remote device report and accept flow 724 (see FIG. 10) and a remote service TD authentication flow 726 (see FIG. 11).

Figure 13:
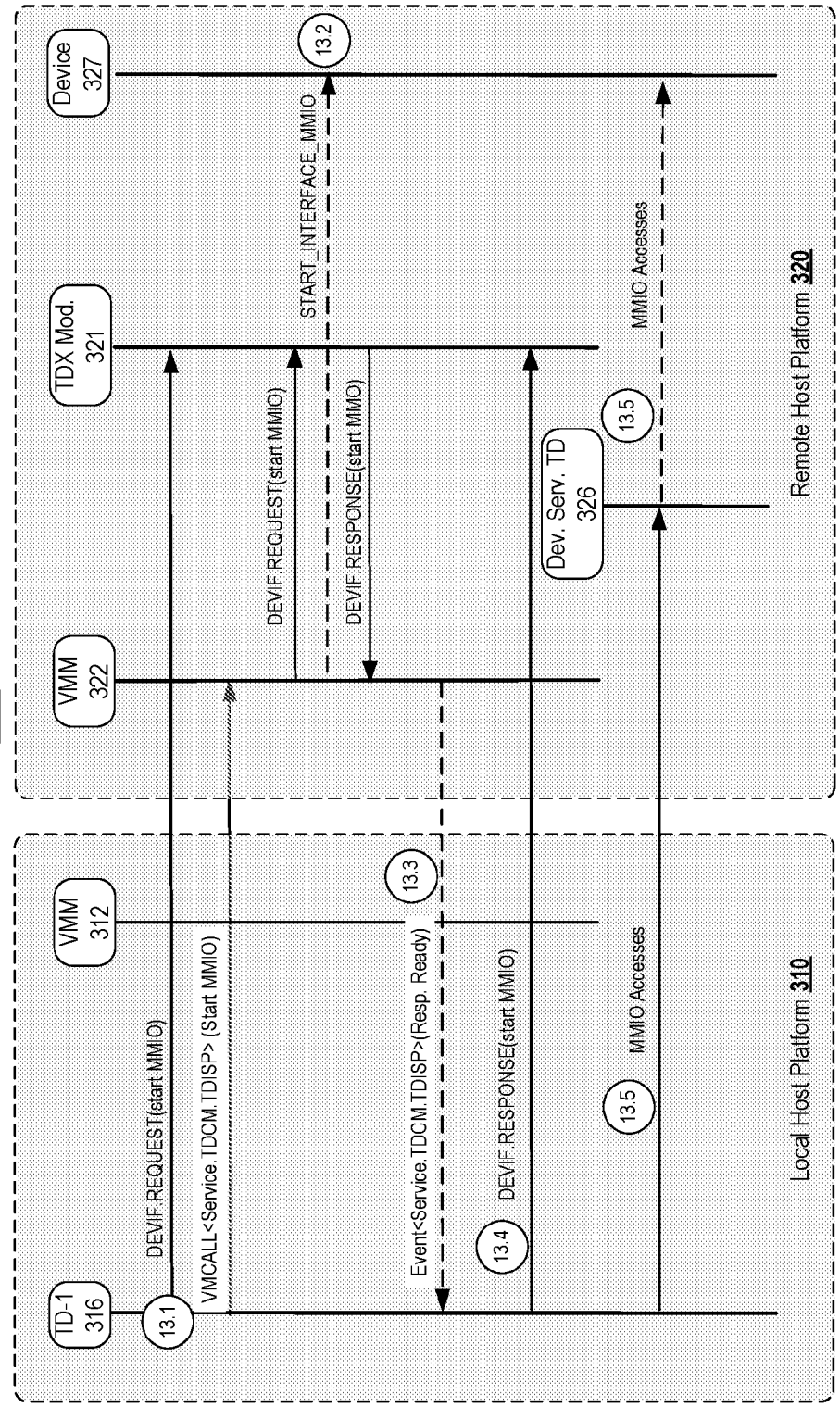
FIG. 13 illustrates an example first flow of the system flow.
Figure 14:
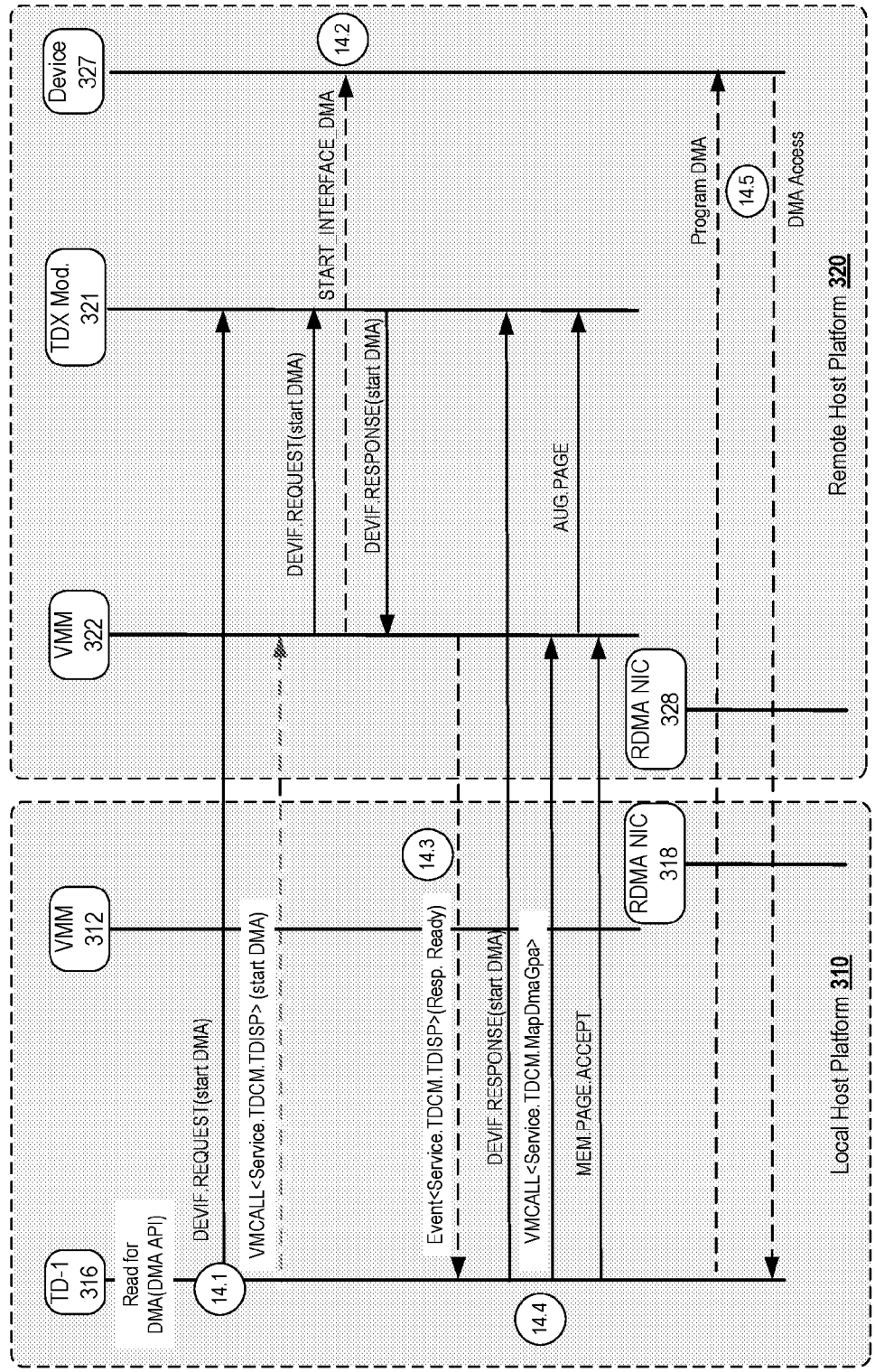
FIG. 14 illustrates an example first flow of the system flow.

In some examples, as shown in FIG. 7, RDMA setup step 730 includes a secure RDMA provisioning flow 732 (see FIG. 12), a remote device MMIO start flow 734 (see FIG. 13), and a remote device DM start flow (see FIG. 14).

Figure 15:
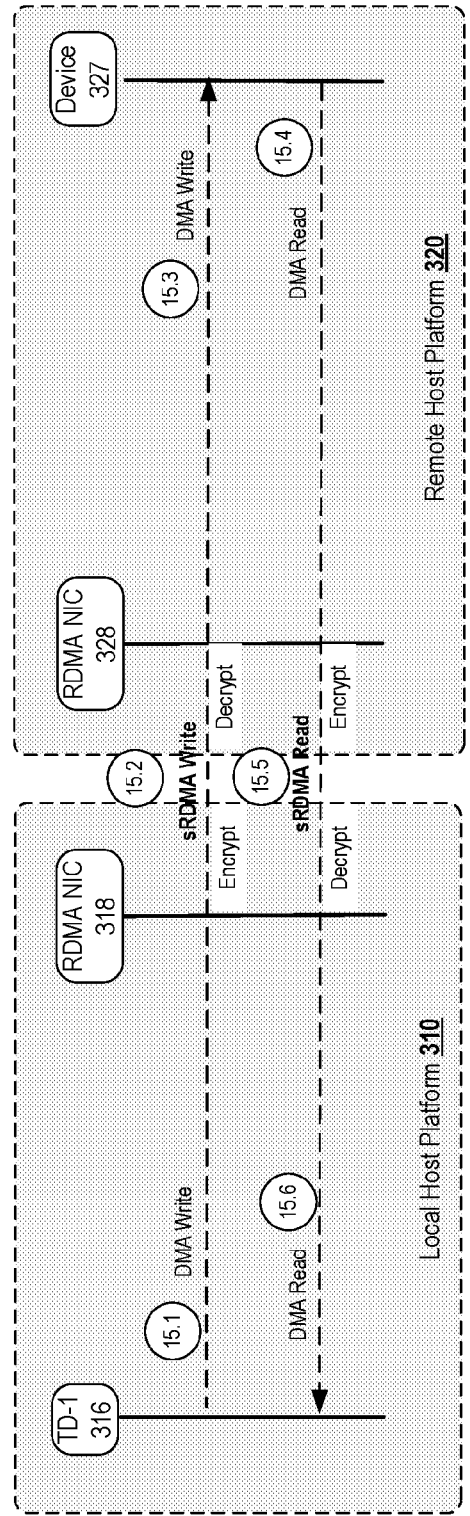
FIG. 15 illustrates an example first flow of the system flow.

According to some examples, as shown in FIG. 7, RDMA runtime step 740 includes a secure RDMA runtime flow 742 (see FIG. 15).

In some examples, flows included in the first three steps of system flow 700 may be implemented via a control flow such as control flow 302 shown in FIG. 3. The flow included the last step, RDMA runtime step 740 may be implemented via a data flow such as data flow 304 also shown in FIG. 3.

FIG. 8 illustrates an example remote device binding flow 712 of system initialization step 710. According to some examples, local host platform 310 owns/controls all device resources, including local devices resident on local host platform 310 and remote devices resident on remote host platform 320.

According to some examples, at 8.1, VMM 312 at local host platform 310 causes TPA 324 to be launched at remote host platform 320. For these examples, TPA 324 is launched to collect device 327 information.

In some examples, at 8.2, TPA 324 generates and sends a VMCALL<Service.TPA.WaitForRequest> message to indicate to VMM 312 that TPA 324 is waiting for a request from VMM 312 (e.g., to gather device information). For these examples, this message may be a type of remote SEAMCALL.

According to some examples, at 8.3, VMM 312 generates and sends an SPDM.CREATE( ) message to indicate to TDX-module 321 to indicate that VMM 312 is to cause a secure SPDM session to be established between TPA 324 and device 327.

In some examples, at 8.4, VMM 312 generates and sends to TPA 324 an Event<Service.TPA.WaitForRequest>(StartSession) to cause TPA 324 to start an SPDM session.

According to some examples, at 8.5, TPA 324 sets up an SPDM session with device 327. For these examples, a VMCALL<Service.SPDM.PCIDOE> message is sent to device 327 to obtain version/capabilities/algorithms/certificate/key_exchange/finish information from device 327.

In some examples, at 8.6, TPA 324 generates and sends a SPDM.SETBINDING( ) message to TDX-module 321 to bind device 327 to the SPDM session.

According to some examples, at 8.7, TPA 324 generates and sends a VMCALL<Service.TPA.ReportStatus> message to VMM 312 to indicate a status of device 327. For these examples, the status may indicate that device 327 has been bound to an SPDM session. Flow 712 then comes to an end.

Figure 9:
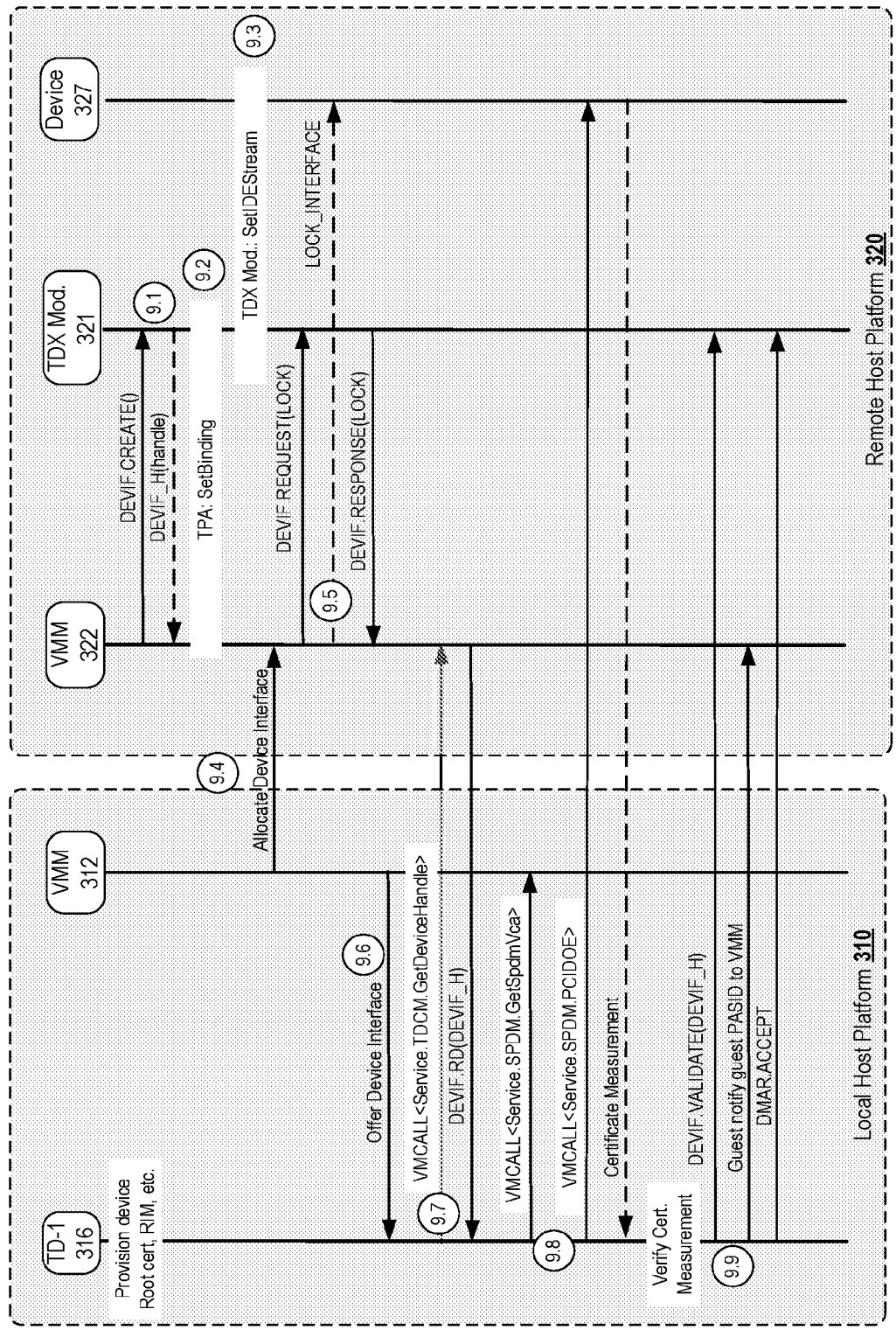
FIG. 9 illustrates an example first flow of the system flow.

FIG. 9 illustrates an example remote device adding and verifying flow 722 of device assignment step 720.

In some examples, at 9.1, VMM 322 generates and sends a DEVIF.CREATE( ) message to TDX-module 321. For these examples, this message is sent to get a device handle for device 327.

According to some examples, at 9.2, TPA: SetBinding indicates that VMM 322 and VMM 312 will follow the device binding set up mentioned in flow 712 for device 327 that was setup by TPA 324.

In some examples, at 9.3, TDX Mod.: SetIDEStream indicates that TDX-module 321 is to set an integrity and data encryption (IDE) stream for device 327. For these examples, setting the IDE stream may include TDX-module 321 configuring IDE encryption keys to be used by device 327 (e.g., when communicating with RDMA NIC 328 through PCIe switch 325 as shown in FIG. 3).

According to some examples, at 9.4, VMM 312 asks VMM 322 to allocate a device interface for device 327.

In some examples, at 9.5, VMM 322 generates and sends a DEVIP.REQUEST(LOCK) message to TDX-module 321 that causes a lock to the device interface for device 327. The lock, for example, allows the device interface for device 327 to be allocated.

According to some examples, at 9.5, TDX-module 321 generates and sends a DEVIF.RESPONSE(LOCK) message to VMM 322 to indicate that the device interface for device 327 has been locked. For these examples, the device interface for device 327 cannot be changed.

In some examples, at 9.6, VMM 312 offers the device interface for device 327 to TD-1 316.

According to some examples, at 9.7, TD-1 316 generates and sends to VMM 322 a VMCALL <Service.TDCM.GetDeviceHandle> message to get the device handle for device 327. For these examples, responsive to receiving the VMCALL<Service.TDCM.GetDeviceHandle> message, VMM 322 sends a DEVIF.RD(DEVIF_H) message to TD-1 316 to provide the device handle for device 327.

In some examples, at 9.8, TD-1 316 generates and sends to VMM 312 a VMCALL<Service.SPDM.GetSpdmVca> TD-1 316 to indicate that a remote SPDM session is going to be set with a remote device to receive information and then generates and sends to device 327 a VMCALL<Service.SPDM.PCIDOE> message to get device 327's information via a remote SPDM session. For these examples, a device certificate measurement from device 327 may result from the sending of the VMCALL<Service.SPDM.PCIDOE> message by TD-1 316.

According to some examples, at 9.9, TD-1 316 verifies the certificate measurement and then generates and sends to TDX-module 321 a DEVIF.VALIDATE(DEVIF_H) message to indicate that the device interface handle for device 327 has been validated based on the verified certificate measurement. TD-1 316 may also send a guest notification of a process address space ID (PASID) to VMM 322 to enable VMM 332 to use the PASID to identify the device interface for device 327. TD-1 316 may also send to TDX-module 321 a DMAR.ACCEPT message to indicate that the certificate measurement was accepted. Flow 722 then comes to an end.

FIG. 10 illustrates an example remote device report and accept flow 724 of device assignment step 720. According to some examples, at 10.1, TD-1 316 generates and sends a DEVIF.REQUEST(REPORT). For these examples, after device 327 has its device interface locked as mentioned above for flow 722, TD-1 316 uses a remote TDCALL to TDX-module 321 to send the DEVIF.REQUEST(REPORT) to obtain a report that indicates device 327's configuration. TD-1 316, at 10.1, also generates and sends a VMCALL<Service.TDCM.TDISP>(REPORT) message to TDX-module 321 that uses a remote TDVMCALL. The remote TDCALL and remote TDVMCALL, for these examples, is to request a device report for device 327 via use of TDISP.

In some examples, at 10.2, responsive to the remote TDVMCALL, VMM 322 generates and sends a DEVIF.REQUEST(REPORT) to TDX-module 321 to cause TDX-module 321 to obtain a DEVICE_INTERFACE_REPORT message from device 327 and then send a DEVIF_RESPONSE(REPORT) to VMM 322 to indicate that the report has been obtained. For these examples, TDX-module 321 uses TDISP to request and receive the report from device 327.

According to some examples, at 10.3, VMM 322 generates and sends to TD-1 316 an Event<Service.TDCM.TDISP>(Resp. Ready) message to TD-1 316 to indicate that TDX-module 321 has obtained the requested report from device 327.

In some examples, at 10.4, TD-1 316 generates and sends to TDX-module 321 a DEVIF.RESPONSE(REPORT) to obtain the report from device 327.

According to some examples, at 10.5, TD-1 316 verifies the authenticity of the report (e.g., via a certificate measurement—not shown).

In some examples, at 10.6, TD-1 316 generates and sends to TDX-module 321 a MMIO.ACCEPT message to indicate that TD-1 316 accepts device 327's configuration that was indicated in the verified report. For these examples, TD-1 316 uses a remote TDCALL to send the MMIO.ACCEPT message to TDX-module 321. Flow 724 then comes to an end.

FIG. 11 illustrates an example a remote service TD authentication flow 726 of device assignment step 720. According to some examples, once TD-1 316 has accepted device 327's configuration, TD-1 316 starts setting up a secure RDMA with device 327. In order to setup the secure RDMA, TD-1 316 first needs to authenticate device service TD 326 at remote host platform 320. Flow 726 describes the authentication flow. For these examples, TD-1 316, at 11.1, communicates with device service TD 326 through VMM 322. The communication may include provisioning device service TD 326, a root certification, information about device service TD 326 such as, but not limited to, trusted computing base (TCB) information.

In some examples, at 11.2, device service TD 326 generates and sends to VMM 322 a GET_QUOTE message to get its quote from VMM 322. For these examples, the quote may be used by device service TD 326 to perform a remote-attestation protocol with TD-1 316.

According to some examples, at 11.3, device service TD 326 generates and sends to TD-1 316 a SET_QUOTE message through VMM 322. For these examples, the SET_QUOTE includes device service TD 326's quote.

In some examples, at 11.4, TD-1 316 verifies the integrity of device service TD 326's quote, and then verifies TD information (e.g., in a TD_REPORT) in the received quote. For these examples, the TD information may include TCB information for device service TD 326.

According to some examples, at 11.5, after TD-1 316 passes the verification of the quote and reported information, TD-1 316 accepts device service TD 326 and establishes a secure session with device service TD 326. For these examples, the secure session may include reuse of a remote-attestation TLS that may include reuse of the remote SPDM established between TD-1 316 and device 327 as mentioned above for flow 722 at 9.8. Flow 726 then comes to an end.

Figure 12:
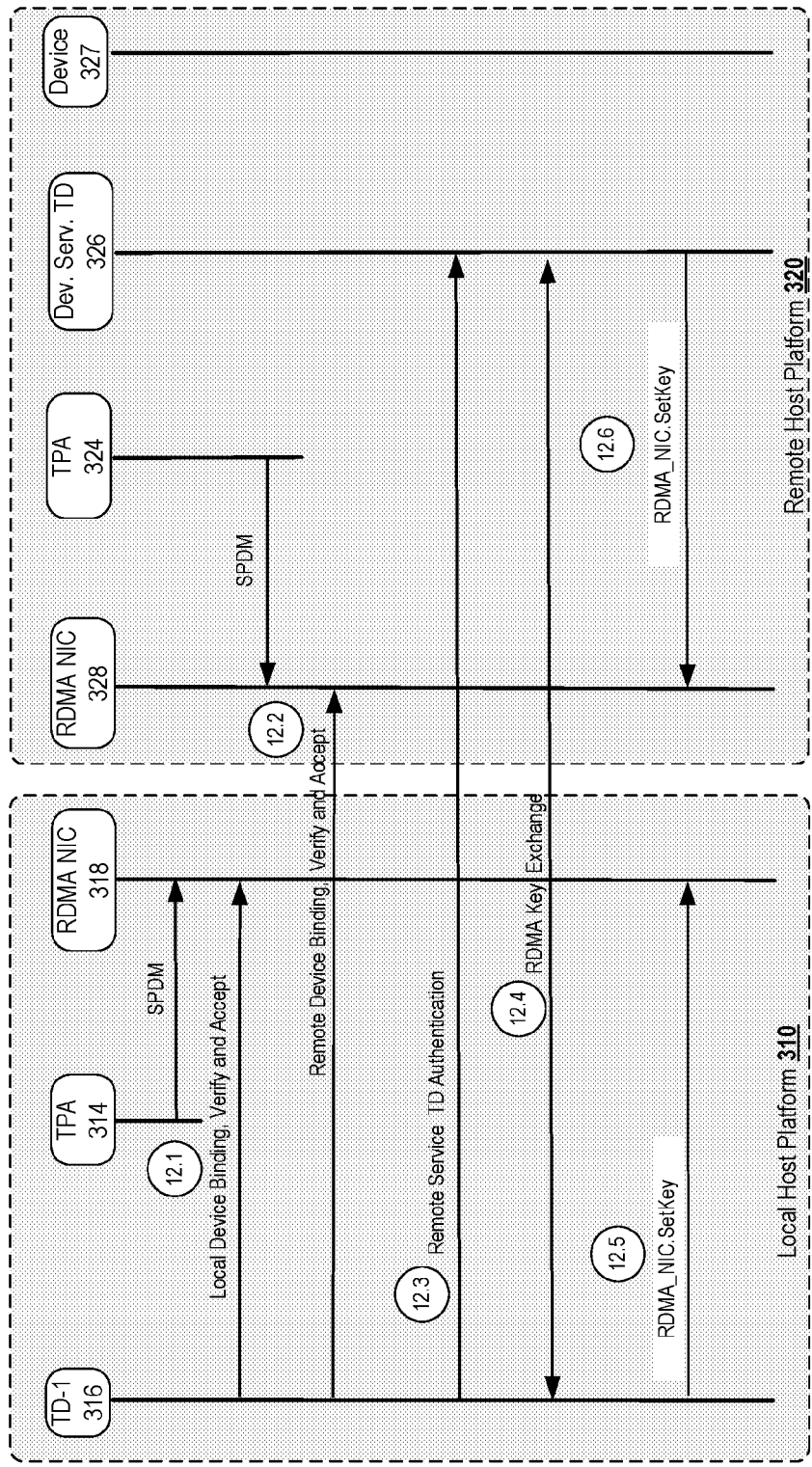
FIG. 12 illustrates an example first flow of the system flow.

FIG. 12 illustrates an example secure RDMA provisioning flow 732 of RDMA setup step 730. In some examples, as briefly mentioned above for FIG. 3 and data flow 304, an sRDMA session is relied upon to enable TD-1 316 to communicate DMA access requests to device 327. For these examples, as described below for flow 732, an sRDMA key needs to be provisioned for RDMA NIC 318 at local host platform 310 and for RDMA NIC 328 at remote host platform 320.

According to some examples, at 12.1, TD-1 316 binds local RDMA NIC 318, verifies local RDMA NIC 318, and accepts local RDMA NIC 318 for use in an sRDMA session. For these examples, TD-1 316 is assisted by local TPA 314 via use of an SPDM communication session to bind, verify and accept local RDMA NIC 318.

In some examples, at 12.2, TD-1 316 binds remote RDMA NIC 328, verifies a remote RDMA NIC 328, and accepts remote RDMA NIC 328 for use in the sRDMA session. For these examples, TD-1 316 is assisted by remote TPA 324 via use of an SPDM communication session to bind, verify and accept remote RDMA NIC 328.

According to some examples, at 12.3, TD-1 316 authenticates remote device service TD 326 in order to be able to implement an RDMA key exchange.

In some examples, at 12.4, TD-1 316 and remote device service TD 326 implement an RDMA key exchange. For these examples, the exchanged RDMA key may be based on RDMA over Converged Ethernet (RoCE) and use of DTLS protocols or iWARP protocols to encrypt or decrypt messages using the exchanged RDMA key.

According to some examples, at 12.5, TD-1 316 generates and sends to local RDMA NIC 318 an RDMA_NIC.SetKey message to set an sRDMA key to local RDMA NIC 318.

According to some examples, at 12.6, remote device service TD 326 generates and sends to remote RDMA NIC 328 an RDMA_NIC.SetKey message to set an sRDMA key to remote RDMA NIC 328. For these examples, now both RDMA NICs at local host platform 310 and remote host platform 320 have the sRDMA key for communication. Flow 732 then comes to an end.

FIG. 13 illustrates an example remote device MMIO start flow 734 of RDMA setup step 730. In some examples, at 13.1, TD-1 316 generates and sends to TDX-module 321 a DEVIF.REQUEST(start MMIO) message and generates and sends to VMM 322 a VMCALL<Service.TDCM.TDISP> (Start MMIO) message. For these examples, TD-1 316 may send the message to TDX-module 321 using a remote TDCALL and send the message to VMM 322 using a remote TDVMCALL.

According to some examples, at 13.2, VMM 322, responsive to the VMCALL<Service.TDCM.TDISP>(Start MMIO) message, generates and sends a DEVIF.REQUEST (start MMIO) message to TDX-module 321 to cause TDX-module 321 to cause device 327 to START_INTERFACE_MMIO. For these examples, to request the start MMIO at device 327 includes the use of TDISP via an SPDM communication session that includes use of TDISP (e.g., via control flow 302). After requesting device 327 to start MMIO, TDX-module 321 generates and sends to VMM 322 a DEVIF.RESPONSE(start MMIO) message to indicate that a MMIO has been requested for device 327.

In some examples, at 13.3, VMM 322 generates and sends to TD-1 316 an Event<Service.TDCM.TDISP>(Response Ready) message to indicate that a request to start MMIO has been made to device 327.

According to some examples, at 13.4, TD-1 316 generates and sends to TDX-module 321 a DEVIF.RESPONSE(start MMIO) message to indicate that TD-1 316 is ready to begin MMIO communications with device 327. For these examples, TD-1 316 may use a remote TDCALL to send this message.

In some examples, at 13.5, TD-1 316 can start MMIO access to device 327 via device service TD 326. For these examples, TD-1 316 may include a local device driver (not shown) to facilitate MMIO accesses to device 327. Flow 734 then comes to an end.

FIG. 14 illustrates an example remote device DMA start flow 736 of RDMA setup step 730. According to some examples, at 14.1, a device driver at TD-1 316 (not shown) may indicate its readiness to start DMA. For these examples, the indication of readiness may include a DMA application programming interface (API). Responsive to the readiness indication, TD-1 316 may generate and send to TDX-module 321 a DEVIF.REQUEST(start DMA) message and generates and sends to VMM 322 a VMCALL <Service. TDCM.TDISP>(Start DMA) message. For these examples, TD-1 316 may send the message to TDX-module 321 using a remote TDCALL and send the message to VMM 322 using a remote TDVMCALL.

In some examples, at 14.2, VMM 322, responsive to the VMCALL<Service.TDCM.TDISP>(Start DMA) message, generates and sends a DEVIF.REQUEST(start DMA) message to TDX-module 321 to cause TDX-module 321 to cause device 327 to START_INTERFACE_DMA. For these examples, to request the start DMA at device 327 includes the use of TDISP. After requesting device 327 to start DMA, TDX-module 321 generates and sends to VMM 322 a DEVIF.RESPONSE(start DMA) message to indicate that DMA has been requested for device 327.

According to some examples, at 14.3, VMM 322 generates and sends to TD-1 316 an Event<Service. TDCM.TDISP>(Response Ready) message to indicate that a request to start DMA has been made to device 327.

In some examples, at 14.4, TD-1 316 generates and sends to TDX-module 321 a DEVIF.RESPONSE(start DMA) message to indicate that TD-1 316 is ready to begin DMA communications with device 327. For these examples, TD-1 316 may use a remote TDCALL to send this message. TD-1 316 may also generate and send to VMM 322 a VMCALL<Service.TDCM.MapDmaGpa> message that causes VMM 322 to generate and send an AUG.PAGE message to TDX module 321. TD-1 316 may then generate and send to VMM 322 a MEM.PAGE.ACCEPT message to indicate completion of DMA setup.

According to some examples, at 14.5, TD-1 316 is able to program DMA to device 327 and able to obtain DMA access through a secure RDMA link that runs through local RDMA NIC 318 and remote RDMA NIC 328. Flow 736 then comes to an end.

FIG. 15 illustrates an example secure RDMA runtime flow 742 of RDMA runtime step 740. In some examples, the completion of system initialization step 710, device assignment step 720 and RDMA setup step 730, as described above, enable TD-1 316 to use secure RDMA (sRDMA) for communications with device 327. For these examples, at 15.1, a device driver at TD-1 316 may issue a DMA write message to device 327. The DMA write message, for this example, is in TD-device secure memory.

According to some examples, local RDMA NIC 318, at 15.2, may encrypt the DMA Write message using the exchanged sRDMA key mentioned above in flow 732 (shown in FIG. 12) to generate an sRDMA Write message. For these examples, remote RDMA NIC 328 may decrypt the sRDMA Write message using the exchanged sRDMA key.

In some examples, at 15.3, the remote RDMA NIC 328 forwards the decrypted DMA Write message to device 327 directly. For these examples, RDMA NIC 328 may send the DMA Write message via a PCI IDE stream that has been setup between RDMA NIC 328 and device 327 as mentioned above in FIG. 3 for data flow 304. The DMA Write message to be protected by an IDE key.

According to some examples, at 15.4, device 327 may send a DMA Read message to TD-1 316 that is first routed through remote RDMA NIC 328. For these examples, device 327 may send the DMA Read message via the PCI IDE stream, the DMA Read message to be protected by the IDE key.

In some examples, remote RDMA NIC 328, at 15.5, may encrypt the DMA Read message using the exchanged sRDMA key to generate an sRDMA Read message. For these examples, local RDMA NIC 318 may decrypt the sRDMA Read message using the exchanged sRDMA key.

According to some examples, at 15.6, local RDMA NIC 328 forwards the decrypted DMA Read message to device 327. For these examples, local RDMA NIC 328 may use TD-device secure memory to forward the DMA Read message. Flow 742 and system flow 700 then comes to an end.

FIG. 16 illustrates an example logic flow 1600. Logic flow 1600 may be representative of the operations implemented by a local TD managed by a trust domain manager included in a hardware processor core resident on a host platform. For example, TD-1 316 managed by TDX-module 311 of a hardware processor core resident on local host platform 310 as shown in FIG. 3 and described above. Also components resident on a remote host platform such as device service TD 326, TDX-module 321, devices 327 or RDMA NIC 328 resident on remote host platform 320 as well as other components of local host platform 310 such as RDMA NIC 318 as shown in FIG. 3 and described above may implement at least portions of logic flow 1600. Examples are not limited to the components shown in FIG. 3 and described above.

In some examples, as shown in FIG. 16, logic flow 1600 at block 1610 may establish a secure communication session with a device interface for an I/O device resident on a remote host platform to enable memory-mapped I/O (MMIO) between the local TD and the I/O device. For these examples, TD-1 316 implemented by TDX-module 311 at local host platform 310 establishes the secure communication session with a device interface for I/O device 327 resident on remote host platform 320. Logic flow 1600 at 1612, as a first part of the establishing of the secure communication session with the device interface, may receive a first message that includes a device interface handle for the I/O device. Logic flow 1600 at 1614, as a second part of the establishing of the secure communication session with the device interface, may establish the secure communication session via receipt of a certificate measurement from the device interface to validate the device interface in order to receive a report that indicates capabilities of the device interface. Logic flow 1600 at 1616, as a third part of the establishing of the secure communication session with the device interface, may accept the capabilities of the device interface to enable MMIO between the local trust domain and the I/O device.

In some examples, logic flow 1600 at block 1620 may cause a secure RDMA session over a network communication link to be set up between a first NIC resident on the host platform and a second NIC resident on the remote host platform to enable DMA between the local TD and the I/O device. For these examples, TD-1 316 causes the secure RDMA session over a network communication link via network 330 to be set up between RDMA NIC 318 at local host platform 310 and RDMA NIC 328 at remote host platform 320 to enable DMA between TD-1 316 and device 327. Logic flow 1600 at 1622, as a first part of the causing the secure RDMA session over the network communication link to be set up, may accept a device service TD for the I/O device. The device service trust domain managed by a second TD manager included in a second hardware processor core resident on the remote host platform, the second TD manager to manage a hardware isolation of the device service TD. Logic flow 1600 at 1624, as a second part of the causing the secure RDMA session over the network communication link to be set up, may establish a secure communication session with the device service TD. Logic flow 1600 at 1626, as a third part of the causing the secure RDMA session over the network communication link to be set up, may exchange an RDMA key with the device service TD via the secure communication session with the device service TD. Logic flow 1600 at 1628, as a fourth part of the causing the secure RDMA session over the network communication link to be set up, may provide the RDMA key to the first NIC, for the first NIC to encrypt or decrypt DMA messages received via the secure RDMA session, wherein the device service TD is to provide the RDMA key to the second NIC, for the first NIC to encrypt or decrypt DMA messages received via the secure RDMA session.

The flows shown in FIGS. 4-16 may be representative of example methodologies for performing novel aspects described in this disclosure. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A flow may be implemented in software, firmware, and/or hardware. In software and firmware embodiments, a software or logic flow may be implemented by computer executable instructions stored on at least one non-transitory computer readable medium or machine readable medium, such as an optical, magnetic or semiconductor storage. The embodiments are not limited in this context.

FIG. 17 illustrates an example of a storage medium. As shown in FIG. 17, the storage medium includes a storage medium 1700. The storage medium 1700 may comprise an article of manufacture. In some examples, storage medium 1700 may include any non-transitory computer readable medium or machine readable medium, such as an optical, magnetic or semiconductor storage. Storage medium 1700 may store various types of computer executable instructions, such as instructions to implement logic flow 1600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 18A:
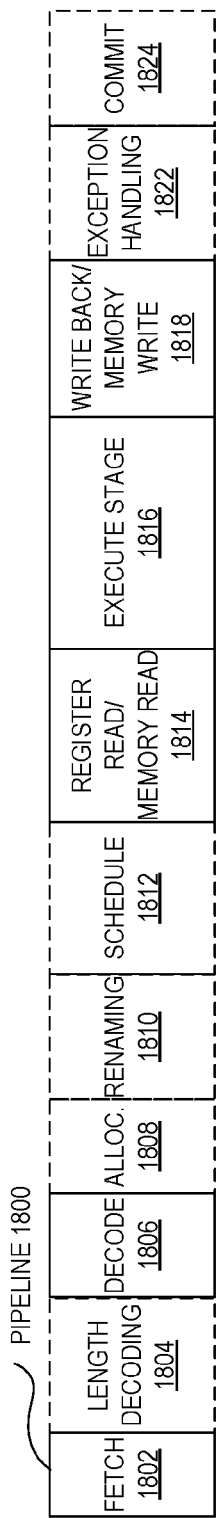
FIGS. 18A and 18B illustrate block diagrams of core architectures.
Figure 18B:
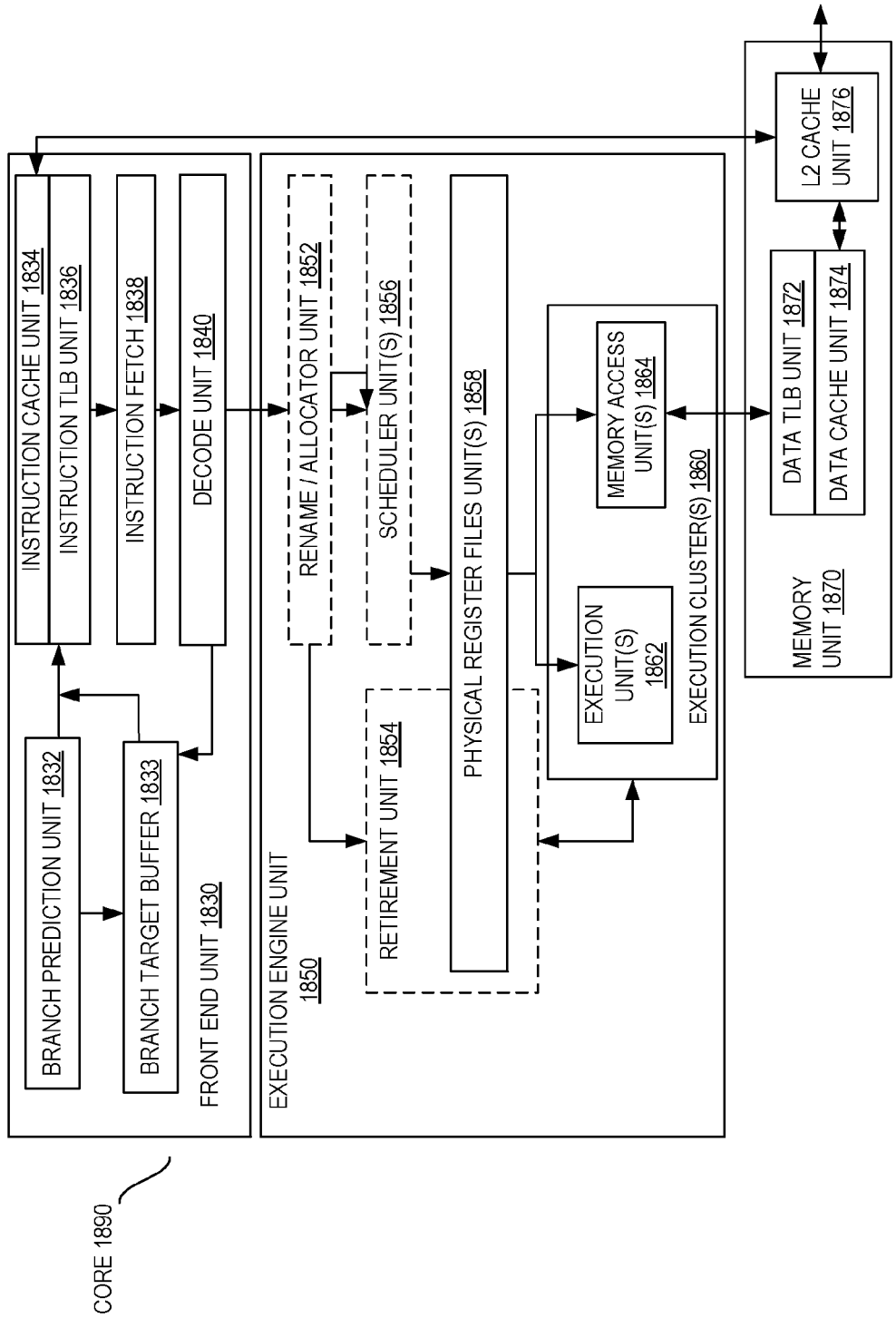

Understand that examples may be used in connection with many different processor architectures. FIG. 18A is a block diagram illustrating both an example in-order pipeline and an example register renaming, out-of-order issue/execution pipeline according to various examples. FIG. 18B is a block diagram illustrating both an example of an in-order architecture core and an example register renaming, out-of-order issue/execution architecture core to be included in a processor according to various examples. In various examples, the described architecture may be used to implement a write operation performed by an I/O agent in an I/O domain at a compute domain shared cache hierarchy. The solid lined boxes in FIGS. 18A and 18B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 18A, a processor pipeline 1800 includes a fetch stage 1802, a length decode stage 1804, a decode stage 1806, an allocation stage 1808, a renaming stage 1810, a scheduling (also known as a dispatch or issue) stage 1812, a register read/memory read stage 1814, an execute stage 1816, a write back/memory write stage 1818, an exception handling stage 1822, and a commit stage 1824. Note that as described herein, in a given example a core may include multiple processing pipelines such as pipeline 1800.

FIG. 18B shows processor core 1890 including a front end unit 1830 coupled to an execution engine unit 1850, and both are coupled to a memory unit 1870. The core 1890 may be a reduced instruction set computing (RISC) core, a complex instruction set computing (CISC) core, a very long instruction word (VLIW) core, or a hybrid or alternative core type. As yet another option, the core 1890 may be a special-purpose core, such as, for example, a network or communication core, compression engine, coprocessor core, general purpose computing graphics processing unit (GPGPU) core, graphics core, or the like.

The front end unit 1830 includes a branch prediction unit 1832 coupled to an instruction cache unit 1834, which is coupled to an instruction translation lookaside buffer (TLB) 1836, which is coupled to an instruction fetch 1838, which is coupled to a decode unit 1840. The decode unit 1840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1840 may be implemented using various different mechanisms. Examples of suitable mechanisms include, but are not limited to, look-up tables, hardware implementations, programmable logic arrays (PLAs), microcode read only memories (ROMs), etc. In some examples, the core 1890 includes a microcode ROM or other medium that stores microcode for certain macroinstructions (e.g., in decode unit 1840 or otherwise within the front end unit 1830). The decode unit 1840 is coupled to a rename/allocator unit 1852 in the execution engine unit 1850.

As further shown in the front end unit 1830, the branch prediction unit 1832 provides prediction information to a branch target buffer 1833.

The execution engine unit 1850 includes the rename/allocator unit 1852 coupled to a retirement unit 1854 and a set of one or more scheduler unit(s) 1856. The scheduler unit(s) 1856 represents any number of different schedulers, including reservations stations, central instruction window, etc. The scheduler unit(s) 1856 is coupled to the physical register file(s) unit(s) 1858. Each of the physical register file(s) units 1858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one example, the physical register file(s) unit 1858 includes a vector registers unit, a write mask registers unit, and a scalar registers unit. These register units may provide architectural vector registers, vector mask registers, and general purpose registers. The physical register file(s) unit(s) 1858 is overlapped by the retirement unit 1854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1854 and the physical register file(s) unit(s) 1858 are coupled to the execution cluster(s) 1860. The execution cluster(s) 1860 includes a set of one or more execution units 1862 and a set of one or more memory access units 1864. The execution units 1862 may perform various operations (e.g., shifts, addition, subtraction, multiplication) and on various types of data (e.g., scalar floating point, packed integer, packed floating point, vector integer, vector floating point). While some examples may include a number of execution units dedicated to specific functions or sets of functions, other examples may include only one execution unit or multiple execution units that all perform all functions. The scheduler unit(s) 1856, physical register file(s) unit(s) 1858, and execution cluster(s) 1860 are shown as being possibly plural because certain examples create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain examples are implemented in which only the execution cluster of this pipeline has the memory access unit(s) 1864). It should also be understood that where separate pipelines are used, one or more of these pipelines may be out-of-order issue/execution and the rest in-order.

The set of memory access units 1864 is coupled to the memory unit 1870, which includes a data TLB unit 1872 coupled to a data cache unit 1874 coupled to a level 2 (L2) cache unit 1876. In one example, the memory access units 1864 may include a load unit, a store address unit, and a store data unit, each of which is coupled to the data TLB unit 1872 in the memory unit 1870. The instruction cache unit 1834 is further coupled to a level 2 (L2) cache unit 1876 in the memory unit 1870. The L2 cache unit 1876 is coupled to one or more other levels of cache and eventually to a main memory.

By way of example, the example register renaming, out-of-order issue/execution core architecture may implement the pipeline 1800 as follows: 1) the instruction fetch 1838 performs the fetch and length decoding stages 1802 and 1804; 2) the decode unit 1840 performs the decode stage 1806; 3) the rename/allocator unit 1852 performs the allocation stage 1808 and renaming stage 1810; 4) the scheduler unit(s) 1856 performs the schedule stage 1812; 5) the physical register file(s) unit(s) 1858 and the memory unit 1870 perform the register read/memory read stage 1814; the execution cluster 1860 perform the execute stage 1816; 6) the memory unit 1870 and the physical register file(s) unit(s) 1858 perform the write back/memory write stage 1818; 7) various units may be involved in the exception handling stage 1822; and 8) the retirement unit 1854 and the physical register file(s) unit(s) 1858 perform the commit stage 1824.

The core 1890 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In some examples, the core 1890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated example of the processor also includes separate instruction and data cache units 1834/1874 and a shared L2 cache unit 1876, alternative examples may have a single internal cache for both instructions and data, such as, for example, a level 1 (L1) internal cache, or multiple levels of internal cache. According to some examples, the system may include a combination of an internal cache and an external cache that is external to the core and/or the processor. Alternatively, all of the cache may be external to the core and/or the processor. Note that an example of the execution engine unit 1850 described above may place a cache line in the shared L2 cache unit 1876 or the L1 internal cache in a placeholder state in response to a request for ownership of the cache line from an I/O agent in an I/O domain thereby reserving the cache line for the performance of a write operation by the I/O agent using examples herein.

Figure 19:
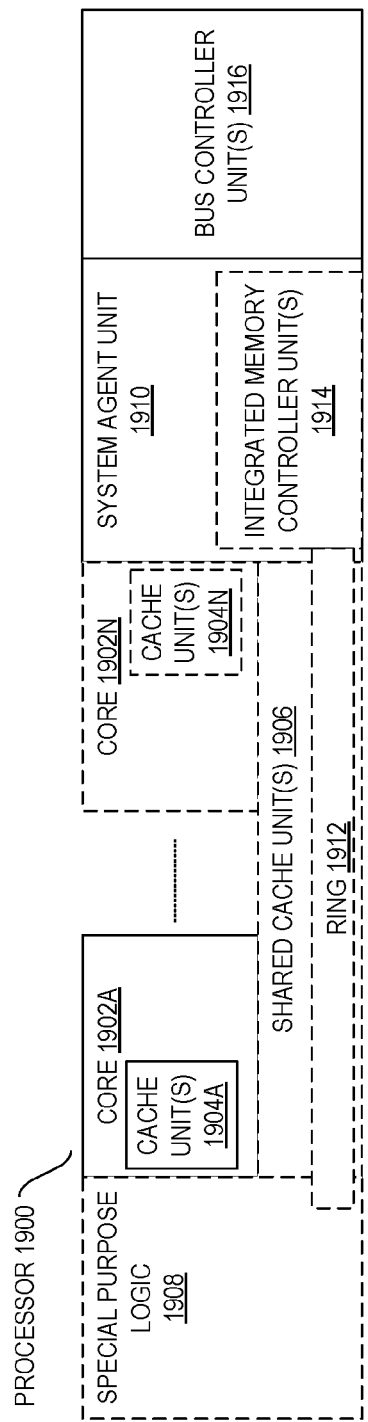
FIG. 19 illustrates an example processor.

FIG. 19 is a block diagram of a processor 1900 that may have more than one core, may have an integrated memory controller, and may have integrated graphics according to various examples. The solid lined boxes in FIG. 19 illustrate a processor 1900 with a single core 1902A, a system agent 1910, a set of one or more bus controller units 1916, while the optional addition of the dashed lined boxes illustrates an alternative processor 1900 with multiple cores 1902A-N, a set of one or more integrated memory controller unit(s) in the system agent unit 1910, and a special purpose logic 1908, which may perform one or more specific functions.

Thus, different implementations of the processor 1900 may include: 1) a CPU with a special purpose logic being integrated graphics and/or scientific (throughput) logic (which may include one or more cores), and the cores 1902A-N being one or more general purpose cores (e.g., general purpose in-order cores, general purpose out-of-order cores, a combination of the two); 2) a coprocessor with the cores 1902A-N being a large number of special purpose cores intended primarily for graphics and/or scientific (throughput); and 3) a coprocessor with the cores 1902A-N being a large number of general purpose in-order cores. Thus, the processor 1900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1900 may be a part of and/or may be implemented on one or more substrates using any of a number of process technologies, such as, for example, BiCMOS, CMOS, or NMOS.

The memory hierarchy includes one or more levels of cache units 1904A-N within the cores, a set or one or more shared cache units 1906, and external memory (not shown) coupled to the set of integrated memory controller units 1914. The set of shared cache units 1906 may include one or more mid-level caches, such as L2, L3, L4, or other levels of cache, a last level cache (LLC), and/or combinations thereof. While in one example a ring based interconnect unit 1912 interconnects the special purpose 1908, the set of shared cache units 1906, and the system agent unit 1910/integrated memory controller unit(s) 1914, alternative examples may use any number of well-known techniques for interconnecting such units.

The system agent unit 1910 includes those components coordinating and operating cores 1902A-N. The system agent unit 1910 may include for example a power control unit (PCU) and a display unit. The PCU may be or include logic and components needed for regulating the power state of the cores 1902A-N and the special purpose logic 1908. The display unit is for driving one or more externally connected displays.

The cores 1902A-N may be homogenous or heterogeneous in terms of architecture instruction set; that is, two or more of the cores 1902A-N may be capable of execution of the same instruction set, while others may be capable of executing only a subset of that instruction set or a different instruction set. In some examples, a cache line in one of the shared cache units 1906 or one of the core cache units 1904A-1904N may be placed in a placeholder state in response to a cache line ownership request received from an I/O agent in an I/O domain thereby reserving the cache line for the performance of a write operation by the I/O agent as described herein.

Figure 20:
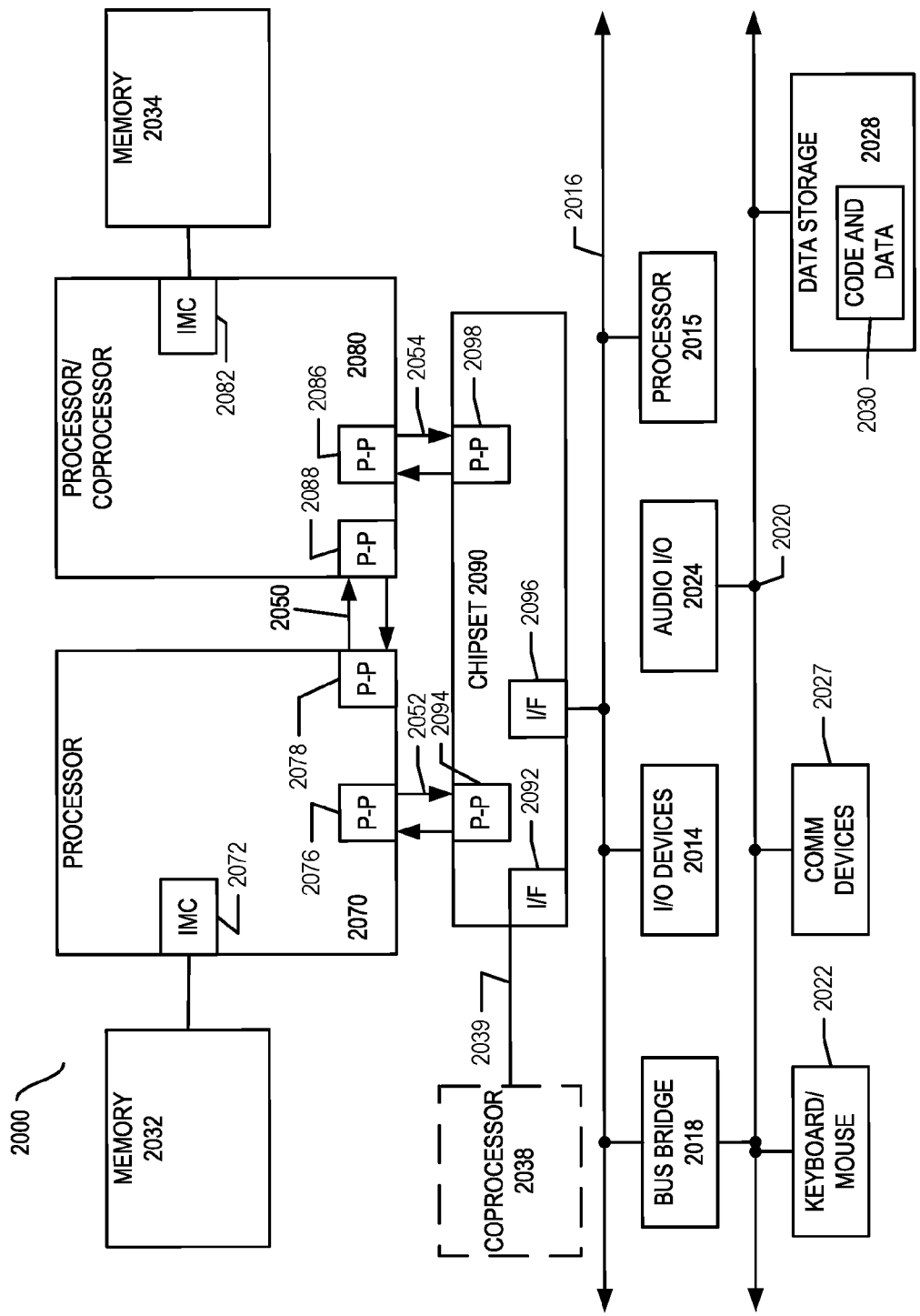
FIG. 20 illustrates a first example computer architecture.
Figure 21:
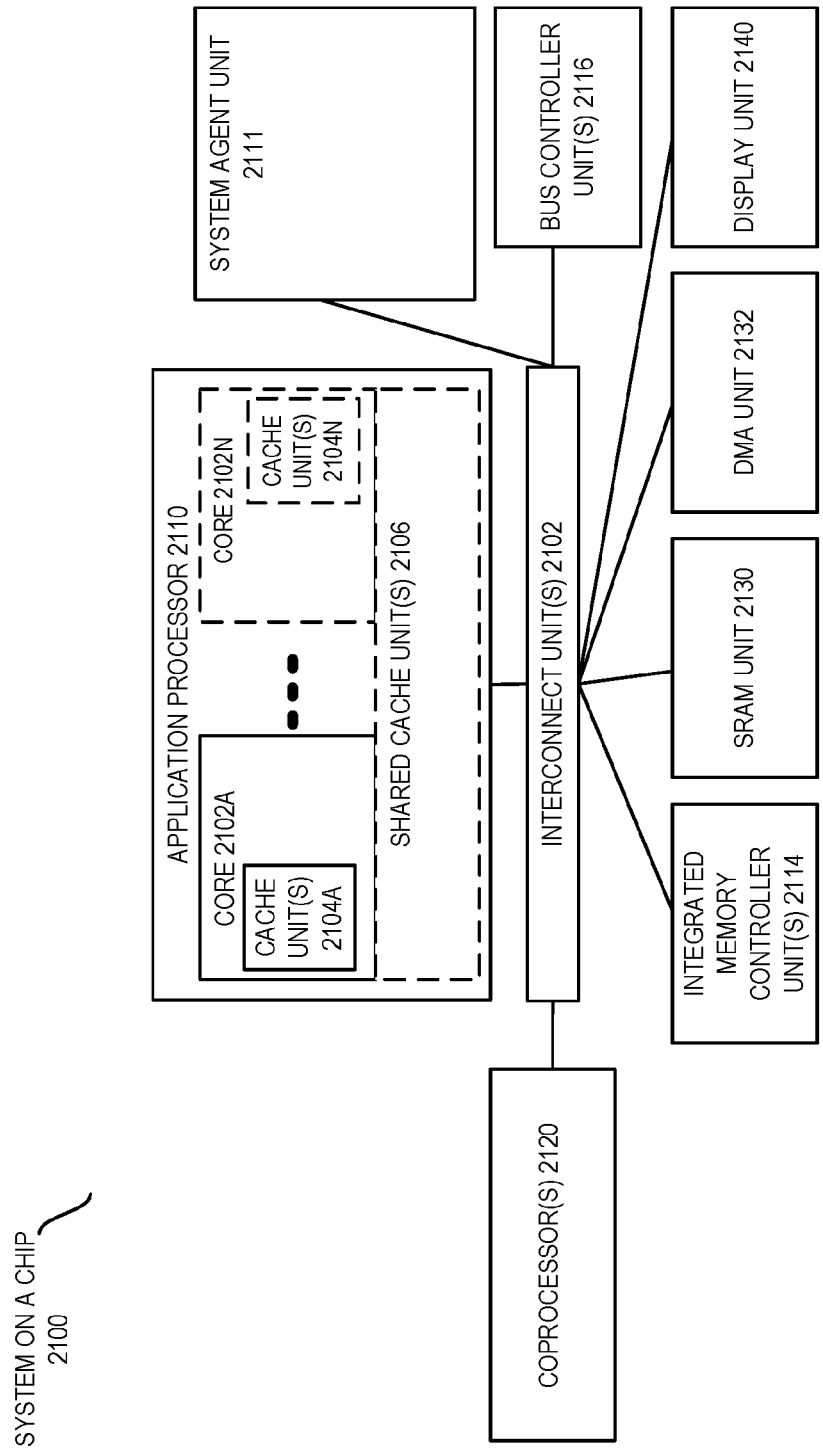
FIG. 21 illustrates a second example computer architecture.

FIGS. 20-21 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a large variety of systems or electronic devices capable of incorporating a processor and/or other execution logic as disclosed herein are generally suitable.

Referring now to FIG. 20, shown is a block diagram of a first more specific example system 2000. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 2000.

Processors 2070 and 2080 are shown including integrated memory controller (IMC) units 2072 and 2082, respectively. Processor 2070 also includes, as part of its bus controller units, point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, integrated memory controllers (IMCs) 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. According to some examples, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode. In some examples, a cache line in the shared cache or the local cache may be placed in a placeholder state in response to an ownership request from an I/O agent in an I/O domain thereby reserving the cache line for the performance of a write operation by the I/O agent.

Chipset 2090 may be coupled to a first bus 2016 via an interface 2096. In some examples, first bus 2016 may be a Peripheral Component Interconnect (PCI) bus, or a bus such as a PCI Express bus or another third generation I/O interconnect bus, although the scope is not so limited.

As shown in FIG. 20, various I/O devices 2014 may be coupled to first bus 2016, along with a bus bridge 2018 which couples first bus 2016 to a second bus 2020. According to some examples, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one example, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one example. Further, an audio I/O 2024 may be coupled to the second bus 2020. Note that other architectures are possible. For example, instead of the point-to-point architecture of FIG. 20, a system may implement a multi-drop bus or other such architecture.

Referring now to FIG. 21, shown is a block diagram of a SoC 2100 in accordance with an example. Dashed lined boxes are optional features on more advanced SoCs. In FIG. 21, an interconnect unit(s) 2102 is coupled to: an application processor 2110 which includes a set of one or more cores 2102A-N (including constituent cache units 2104A-N); shared cache unit(s) 2106; a system agent unit 2112; a bus controller unit(s) 2116; an integrated memory controller unit(s) 2114; a set or one or more coprocessors 2120 which may include integrated graphics logic, an image processor, an audio processor, and a video processor; a static random access memory (SRAM) unit 2130; a direct memory access (DMA) unit 2132; and a display unit 2140 for coupling to one or more external displays. In one example, the coprocessor(s) 2120 include a special-purpose processor, such as, for example, a network or communication processor, compression engine, GPGPU, a high-throughput MIC processor, embedded processor, or the like. In various examples, a cache line in a constituent cache unit 2104A-N or in a shared cache unit 2106 may be placed in a placeholder state in response to an ownership request for a cache line from an I/O agent in an I/O domain thereby reserving the cache line for the performance of a write operation by the I/O agent.

Examples of the mechanisms disclosed herein may be implemented in hardware, software, firmware, or a combination of such implementation approaches. Various examples may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, various examples also include non-transitory, tangible machine-readable media containing instructions or containing design data, such as Hardware Description Language (HDL), which defines structures, circuits, apparatuses, processors and/or system features described herein. Such examples may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
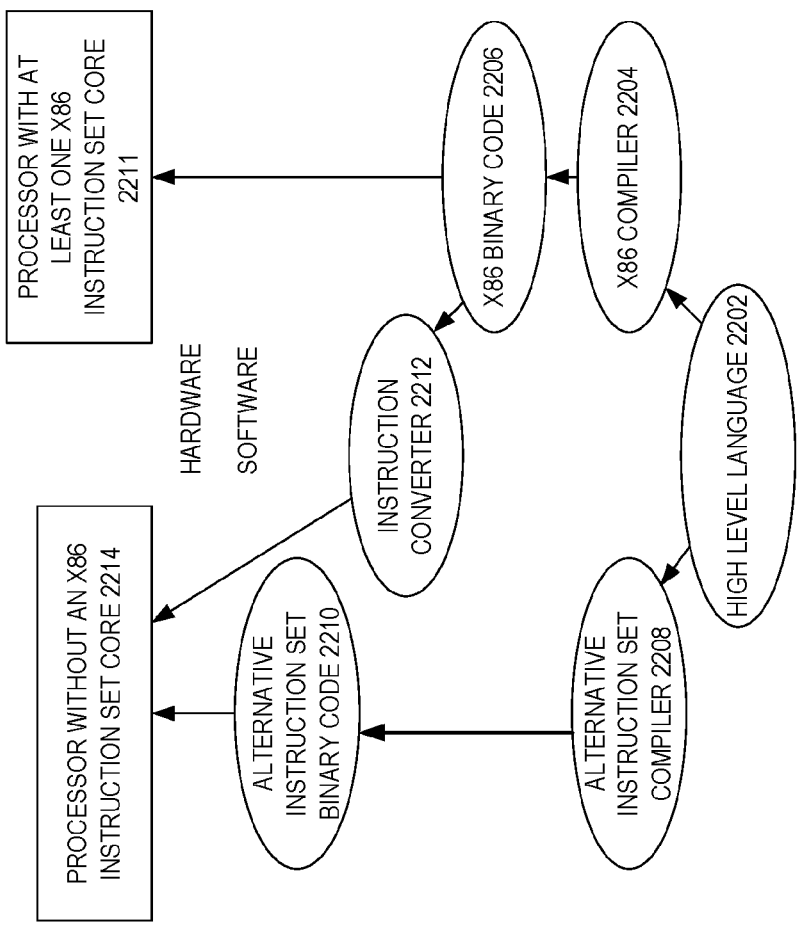
FIG. 22 illustrates an example software instruction converter.

FIG. 22 is a block diagram contrasting the use of a software instruction converter to convert binary instructions in a source instruction set to binary instructions in a target instruction set according to various examples. In the illustrated example, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x186 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, CA and/or that execute the ARM instruction set of ARM Holdings of Sunnyvale, CA). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation, or any other process, allows a processor or other electronic device that does not have an x86 instruction set processor or core to execute the x86 binary code 2206

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to additional examples of technologies disclosed herein.

Example 1. An example apparatus may include a first hardware processor core resident on a first host platform, the first hardware processor core to include a first trust domain manager to manage a hardware isolated virtual machine as a local trust domain. The local trust domain may establish a secure communication session with a device interface for an I/O device resident on a second host platform to enable MMIO between the local trust domain and the I/O device. The local trust domain to also cause a secure RDMA session over a network communication link to be set up between a first NIC resident on the first host platform and a second NIC resident on the second host platform to enable DMA between the local trust domain and the I/O device.

Example 2. The apparatus of example 1, the secure communication session with the device interface may be established according to the SPDM specification.

Example 3. The apparatus of example 1, to establish the secure communication session with the device interface may also include the local trust domain to receive a first message that includes a device interface handle for the I/O device. The local trust domain may also establish the secure communication session via receipt of a certificate measurement from the device interface to validate the device interface in order to receive a report that indicates capabilities of the device interface. The local trust domain may also accept the capabilities of the device interface to enable MMIO between the local trust domain and the I/O device.

Example 4. The apparatus of example 1, the secure RDMA session may include RDMA over Converged Ethernet (RoCE) and use of at least one of Datagram Transport Layer Security (DTLS) protocols or iWARP protocols to at least one of encrypt or decrypt DMA messages between the local trust domain and the I/O device.

Example 5. The apparatus of example 1, to cause the secure RDMA session over a network communication link to be set up between the first NIC and the second NIC further include the local trust domain to accept a device service trust domain for the I/O device. The device service trust domain may be managed by a second trust domain manager included in a second hardware processor core resident on the second host platform. The second trust domain manager may manage a hardware isolation of the device service trust domain. The local trust domain may also establish a secure communication session with the device service trust domain. The local trust domain may also exchange an RDMA key with the device service trust domain via the secure communication session with the device service trust domain. The local trust domain may also provide the RDMA key to the first NIC, for the first NIC to encrypt or decrypt DMA messages received via the secure RDMA session. For this example, the device service trust domain is to provide the RDMA key to the second NIC, for the first NIC to encrypt or decrypt DMA messages received via the secure RDMA session.

Example 6. The apparatus of example 5, the secure communication session with the device service trust domain may be established according to the SPDM specification.

Example 7. The apparatus of example 1, the I/O device may be an accelerator device, a memory device or a storage device.

Example 8. An example method implemented by a local trust domain managed by a trust domain manager included in a hardware processor core resident on a host platform. The method may include establishing a secure communication session with a device interface for an I/O device resident on a remote host platform to enable MMIO between the local trust domain and the I/O device. The method may also include causing a secure RDMA session over a network communication link to be set up between a first NIC resident on the host platform and a second NIC resident on the remote host platform to enable DMA between the local trust domain and the I/O device.

Example 9. The method of example 8, establishing the secure communication session with the device interface may include establishing the secure communication session according to the SPDM specification.

Example 10. The method of example 8, establishing the secure communication session with the device interface may also include receiving a first message that includes a device interface handle for the I/O device. Establishing the secure communication session with the device interface may also include establishing the secure communication session via receipt of a certificate measurement from the device interface to validate the device interface in order to receive a report that indicates capabilities of the device interface. Establishing the secure communication session with the device interface may also include accepting the capabilities of the device interface to enable MMIO between the local trust domain and the I/O device.

Example 11. The method of example 8, the secure RDMA session may include RDMA over Converged Ethernet (RoCE) and use of at least one of Datagram Transport Layer Security (DTLS) protocols or iWARP protocols to at least one of encrypt or decrypt DMA messages between the local trust domain and the I/O device.

Example 12. The method of example 8, causing the secure RDMA session over a network communication link to be set up between the first NIC and the second NIC may also include accepting a device service trust domain for the I/O device. The device service trust domain may be managed by a second trust domain manager included in a second hardware processor core resident on the remote host platform. The second trust domain manager may manage a hardware isolation of the device service trust domain. Causing the secure RDMA session over a network communication link to be set up between the first NIC and the second NIC may also include establishing a secure communication session with the device service trust domain. Causing the secure RDMA session over a network communication link to be set up between the first NIC and the second NIC may also include exchanging an RDMA key with the device service trust domain via the secure communication session with the device service trust domain. Causing the secure RDMA session over a network communication link to be set up between the first NIC and the second NIC may also include providing the RDMA key to the first NIC, for the first NIC to encrypt or decrypt DMA messages received via the secure RDMA session, wherein the device service trust domain is to provide the RDMA key to the second NIC, for the first NIC to encrypt or decrypt DMA messages received via the secure RDMA session.

Example 13. The method of example 12, establishing the secure communication session with the device service trust domain may include establishing according to the SPDM specification.

Example 14. The method of example 8, the I/O device may be an accelerator device, a memory device or a storage device.

Example 15. An example at least one machine readable medium may include a plurality of instructions that in response to being executed by circuitry may cause the circuitry to carry out a method according to any one of examples 8 to 14.

Example 16. An example apparatus may include means for performing the methods of any one of examples 8 to 14.

Example 17. An example at least one non-transitory computer-readable storage medium that includes a plurality of instructions. The plurality of instructions, when executed by a local trust domain managed by a trust domain manager included in a hardware processor core resident on a first host platform, enable the local trust domain to establish a secure communication session with a device interface for an I/O device resident on a second host platform to enable MMIO between the local trust domain. The instructions may also enable the local trust domain to cause a secure RDMA session over a network communication link to be set up between a first NIC resident on the first host platform and a second NIC resident on the second host platform to enable DMA between the local trust domain and the I/O device.

Example 18. The least one non-transitory computer-readable storage medium of example 17, the secure communication session with the device interface may be established according to the SPDM specification.

Example 19. The least one non-transitory computer-readable storage medium of example 17, to establish the secure communication session with the device interface may include the instructions to cause the local trust domain to receive a first message that includes a device interface handle for the I/O device. The instructions may also cause the local trust domain to establish the secure communication session via receipt of a certificate measurement from the device interface to validate the device interface in order to receive a report that indicates capabilities of the device interface. The instructions may also cause the local trust domain to accept the capabilities of the device interface to enable MMIO between the local trust domain and the I/O device.

Example 20. The least one non-transitory computer-readable storage medium of example 17, the secure RDMA session may include RDMA over Converged Ethernet (RoCE) and use of at least one of Datagram Transport Layer Security (DTLS) protocols or iWARP protocols to at least one of encrypt or decrypt DMA messages between the local trust domain and the I/O device.

Example 21. The least one non-transitory computer-readable storage medium of example 17, to cause the secure RDMA session over a network communication link to be set up between the first NIC and the second NIC may also the instructions to cause the local trust domain to accept a device service trust domain for the I/O device. The device service trust domain may be managed by a second trust domain manager included in a second hardware processor core resident on the second host platform. The second trust domain manager may manage a hardware isolation of the device service trust domain. The instructions may also cause the local trust domain to establish a secure communication session with the device service trust domain. The instructions may also cause the local trust domain to exchange an RDMA key with the device service trust domain via the secure communication session with the device service trust domain. The instructions may also cause the local trust domain to provide the RDMA key to the first NIC, for the first NIC to encrypt or decrypt DMA messages received via the secure RDMA session, wherein the device service trust domain is to provide the RDMA key to the second NIC, for the first NIC to encrypt or decrypt DMA messages received via the secure RDMA session.

Example 22. The least one non-transitory computer-readable storage medium of example 21, the secure communication session with the device service trust domain may be established according to the SPDM specification.

Example 23. The least one non-transitory computer-readable storage medium of example 17, the I/O device may be an accelerator device, a memory device or a storage device.

It is emphasized that the Abstract of the Disclosure is provided to comply with 37 C.F.R. Section 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a first hardware processor core resident on a first host platform, the first hardware processor core to include a first trust domain manager to manage a hardware isolated virtual machine as a local trust domain, wherein the local trust domain is to:
establish a secure communication session with a device interface for an input/output (I/O) device resident on a second host platform to enable memory-mapped I/O (MMIO) between the local trust domain and the I/O device; and
cause a secure remote direct memory access (RDMA) session over a network communication link to be set up between a first network interface card (NIC) resident on the first host platform and a second NIC resident on the second host platform to enable direct memory access (DMA) between the local trust domain and the I/O device.

2. The apparatus of claim 1, wherein the secure communication session with the device interface is established according to a Secure Protocol and Data Model (SPDM) specification.

3. The apparatus of claim 1, wherein to establish the secure communication session with the device interface further comprises the local trust domain to:
receive a first message that includes a device interface handle for the I/O device;
establish the secure communication session via receipt of a certificate measurement from the device interface to validate the device interface in order to receive a report that indicates capabilities of the device interface; and
accept the capabilities of the device interface to enable MMIO between the local trust domain and the I/O device.

4. The apparatus of claim 1, wherein the secure RDMA session includes RDMA over Converged Ethernet (RoCE) and use of at least one of Datagram Transport Layer Security (DTLS) protocols or iWARP protocols to at least one of encrypt or decrypt DMA messages between the local trust domain and the I/O device.

5. The apparatus of claim 1, wherein to cause the secure RDMA session over a network communication link to be set up between the first NIC and the second NIC further comprises the local trust domain to:
accept a device service trust domain for the I/O device, the device service trust domain managed by a second trust domain manager included in a second hardware processor core resident on the second host platform, the second trust domain manager to manage a hardware isolation of the device service trust domain;
establish a secure communication session with the device service trust domain;
exchange an RDMA key with the device service trust domain via the secure communication session with the device service trust domain; and provide the RDMA key to the first NIC, for the first NIC to encrypt or decrypt DMA messages received via the secure RDMA session, wherein the device service trust domain is to provide the RDMA key to the second NIC, for the first NIC to encrypt or decrypt DMA messages received via the secure RDMA session.

6. The apparatus of claim 5, wherein the secure communication session with the device service trust domain is established according to a Secure Protocol and Data Model (SPDM) specification.

7. The apparatus of claim 1, wherein the I/O device comprises an accelerator device, a memory device or a storage device.

8. A method implemented by a local trust domain managed by a trust domain manager included in a hardware processor core resident on a host platform, the method comprising:
    establishing a secure communication session with a device interface for an input/output (I/O) device resident on a remote host platform to enable memory-mapped I/O (MMIO) between the local trust domain and the I/O device; and
    causing a secure remote direct memory access (RDMA) session over a network communication link to be set up between a first network interface card (NIC) resident on the host platform and a second NIC resident on the remote host platform to enable direct memory access (DMA) between the local trust domain and the I/O device.

9. The method of claim 8, wherein establishing the secure communication session with the device interface comprises establishing the secure communication session according to a Secure Protocol and Data Model (SPDM) specification.

10. The method of claim 8, wherein establishing the secure communication session with the device interface further comprises:
    receiving a first message that includes a device interface handle for the I/O device;
    establishing the secure communication session via receipt of a certificate measurement from the device interface to validate the device interface in order to receive a report that indicates capabilities of the device interface; and
    accepting the capabilities of the device interface to enable MMIO between the local trust domain and the I/O device.

11. The method of claim 8, wherein the secure RDMA session includes RDMA over Converged Ethernet (RoCE) and use of at least one of Datagram Transport Layer Security (DTLS) protocols or iWARP protocols to at least one of encrypt or decrypt DMA messages between the local trust domain and the I/O device.

12. The method of claim 8, wherein causing the secure RDMA session over a network communication link to be set up between the first NIC and the second NIC further comprises:
    accepting a device service trust domain for the I/O device, the device service trust domain managed by a second trust domain manager included in a second hardware processor core resident on the remote host platform, the second trust domain manager to manage a hardware isolation of the device service trust domain;
    establishing a secure communication session with the device service trust domain;
    exchanging an RDMA key with the device service trust domain via the secure communication session with the device service trust domain; and
    providing the RDMA key to the first NIC, for the first NIC to encrypt or decrypt DMA messages received via the secure RDMA session, wherein the device service trust domain is to provide the RDMA key to the second NIC, for the first NIC to encrypt or decrypt DMA messages received via the secure RDMA session.

13. The method of claim 12, wherein establishing the secure communication session with the device service trust domain comprises establishing according to a Secure Protocol and Data Model (SPDM) specification.

14. At least one non-transitory computer-readable storage medium, comprising a plurality of instructions, that when executed by a local trust domain managed by a trust domain manager included in a hardware processor core resident on a first host platform, enable the local trust domain to:
    establish a secure communication session with a device interface for an input/output (I/O) device resident on a second host platform to enable memory-mapped I/O (MMIO) between the local trust domain; and
    cause a secure remote direct memory access (RDMA) session over a network communication link to be set up between a first network interface card (NIC) resident on the first host platform and a second NIC resident on the second host platform to enable direct memory access (DMA) between the local trust domain and the I/O device.

15. The least one non-transitory computer-readable storage medium of claim 14, wherein the secure communication session with the device interface is established according to a Secure Protocol and Data Model (SPDM) specification.

16. The least one non-transitory computer-readable storage medium of claim 14, wherein to establish the secure communication session with the device interface further comprises the instructions to cause the local trust domain to:
    receive a first message that includes a device interface handle for the I/O device;
    establish the secure communication session via receipt of a certificate measurement from the device interface to validate the device interface in order to receive a report that indicates capabilities of the device interface; and
    accept the capabilities of the device interface to enable MMIO between the local trust domain and the I/O device.

17. The least one non-transitory computer-readable storage medium of claim 14, wherein the secure RDMA session includes RDMA over Converged Ethernet (ROCE) and use of at least one of Datagram Transport Layer Security (DTLS) protocols or iWARP protocols to at least one of encrypt or decrypt DMA messages between the local trust domain and the I/O device.

18. The least one non-transitory computer-readable storage medium of claim 14, wherein to cause the secure RDMA session over a network communication link to be set up between the first NIC and the second NIC further comprises the instructions to cause the local trust domain to:
    accept a device service trust domain for the I/O device, the device service trust domain managed by a second trust domain manager included in a second hardware processor core resident on the second host platform, the second trust domain manager to manage a hardware isolation of the device service trust domain;
    establish a secure communication session with the device service trust domain;
    exchange an RDMA key with the device service trust domain via the secure communication session with the device service trust domain; and provide the RDMA key to the first NIC, for the first NIC to encrypt or decrypt DMA messages received via the secure RDMA session, wherein the device service trust domain is to provide the RDMA key to the second NIC, for the first NIC to encrypt or decrypt DMA messages received via the secure RDMA session.

19. The least one non-transitory computer-readable storage medium of claim 18, wherein the secure communication session with the device service trust domain is established according to a Secure Protocol and Data Model (SPDM) specification.

20. The least one non-transitory computer-readable storage medium of claim 14, wherein the I/O device comprises an accelerator device, a memory device or a storage device.

* * * * *